US009663226B2

(12) United States Patent
Canavor et al.

(10) Patent No.: US 9,663,226 B2
(45) Date of Patent: May 30, 2017

(54) INFLUENCING ACCEPTANCE OF MESSAGES IN UNMANNED VEHICLES

(71) Applicant: Amazon Technologies, Inc., Seattle, WA (US)

(72) Inventors: Darren Ernest Canavor, Redmond, WA (US); Varadarajan Gopalakrishnan, Cupertino, CA (US); Jesper Mikael Johansson, Redmond, WA (US); Jon Arron McClintock, Seattle, WA (US); Brandon William Porter, Yarrow Point, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/671,203

(22) Filed: Mar. 27, 2015

(65) Prior Publication Data
US 2016/0280370 A1   Sep. 29, 2016

(51) Int. Cl.
*G07C 5/00* (2006.01)
*B64C 39/00* (2006.01)
*B64C 39/02* (2006.01)
*H04W 12/06* (2009.01)

(52) U.S. Cl.
CPC ........... *B64C 39/024* (2013.01); *H04W 12/06* (2013.01); *B64C 2201/141* (2013.01); *B64C 2201/146* (2013.01)

(58) Field of Classification Search
CPC combination set(s) only.
See application file for complete search history.

(56) References Cited

U.S. PATENT DOCUMENTS

| | | |
|---|---|---|
| 4,668,950 A | 5/1987 | Russell, Jr. et al. |
| 7,047,425 B2 | 5/2006 | Dubuque |
| 7,073,748 B2 | 7/2006 | Maurer et al. |
| 7,634,280 B2 | 12/2009 | Modeo |
| 7,653,696 B2 | 1/2010 | Brown et al. |
| 7,929,702 B2 | 4/2011 | Brown et al. |
| 7,958,544 B2 | 6/2011 | Chen et al. |
| 8,132,005 B2 | 3/2012 | Tarkkala et al. |

(Continued)

FOREIGN PATENT DOCUMENTS

IL    189095    11/2011

OTHER PUBLICATIONS

"Information technology—Trusted Platform Module—Part 1: Overview," International Organization for Standardization/International Electrotechnical Commission ISO/IEC 11889-1:2009(E), May 15, 2009, 20 pages.

(Continued)

*Primary Examiner* — Yonel Beaulieu
(74) *Attorney, Agent, or Firm* — Davis Wright Tremaine LLP

(57) ABSTRACT

An unmanned vehicle receives a message from another unmanned vehicle. The recipient unmanned vehicle uses information included with the message to determine whether a quorum of other unmanned vehicles have vetted information in the message. If a quorum of unmanned vehicles have vetted the message, the unmanned vehicle uses the information in the message to determine how to perform one or more operations.

20 Claims, 14 Drawing Sheets

(56) References Cited

U.S. PATENT DOCUMENTS

| | | |
|---|---|---|
| 8,515,609 B2 | 8/2013 | McAndrew et al. |
| 8,621,218 B2 | 12/2013 | Kwon et al. |
| 8,627,086 B2 | 1/2014 | Gehrmann et al. |
| 8,725,643 B2 | 5/2014 | Brown et al. |
| 8,892,886 B2 | 11/2014 | Konrad et al. |
| 9,256,994 B2 | 2/2016 | Downey et al. |
| 2003/0172278 A1 | 9/2003 | Farnham et al. |
| 2005/0038991 A1 | 2/2005 | Brown et al. |
| 2005/0132201 A1 | 6/2005 | Pitman et al. |
| 2006/0183489 A1 | 8/2006 | Modeo |
| 2008/0077290 A1 | 3/2008 | Weinmann et al. |
| 2008/0178300 A1 | 7/2008 | Brown et al. |
| 2008/0182592 A1 | 7/2008 | Cha et al. |
| 2010/0250932 A1 | 9/2010 | Dill et al. |
| 2010/0251374 A1 | 9/2010 | Dill et al. |
| 2011/0010543 A1 | 1/2011 | Schmidt et al. |
| 2011/0035149 A1 | 2/2011 | McAndrew et al. |
| 2014/0067167 A1* | 3/2014 | Levien .................. A61M 5/20 701/3 |
| 2014/0074339 A1 | 3/2014 | Casado et al. |
| 2014/0074746 A1 | 3/2014 | Wang |
| 2014/0163852 A1 | 6/2014 | Borri et al. |
| 2014/0222248 A1* | 8/2014 | Levien .................. B64C 39/024 701/2 |
| 2014/0222250 A1 | 8/2014 | Khazan et al. |
| 2015/0280919 A1 | 10/2015 | Cullen et al. |
| 2015/0298786 A1* | 10/2015 | Stigler .................. B64B 1/10 244/30 |
| 2015/0302858 A1* | 10/2015 | Hearing .................. G10L 19/00 381/58 |
| 2015/0317596 A1* | 11/2015 | Hejazi .................. G06Q 50/32 705/330 |
| 2015/0331099 A1 | 11/2015 | Wu et al. |
| 2016/0006719 A1 | 1/2016 | Khalil et al. |
| 2016/0031564 A1* | 2/2016 | Yates .................. B64D 33/00 307/9.1 |
| 2016/0124434 A1 | 5/2016 | Gariepy et al. |
| 2016/0180717 A1 | 6/2016 | Ubhi et al. |
| 2016/0300495 A1 | 10/2016 | Kantor et al. |

OTHER PUBLICATIONS

"Information technology—Trusted Platform Module—Part 2: Design principles," International Organization for Standardization/International Electrotechnical Commission ISO/IEC 11889-2:2009(E), May 15, 2009, 152 pages.

"Information technology—Trusted Platform Module—Part 3: Structures," International Organization for Standardization/International Electrotechnical Commission ISO/IEC 11889-3:2009(E), May 15, 2009, 204 pages.

"Information technology—Trusted Platform Module—Part 4: Commands," International Organization for Standardization/International Electrotechnical Commission ISO/IEC 11889-4:2009(E), May 15, 2009, 254 pages.

"TPM Main: Part 1 Design Principles—Specification Version 1.2—Level 2 Revision 103," Trusted Computing Group, Inc., Jul. 9, 2007, 182 pages.

"TPM Main: Part 2 TPM Structures—Specification Version 1.2—Level 2 Revision 103," Trusted Computing Group, Inc., Jul. 9, 2007, 198 pages.

"TPM Main: Part 3 Commands—Specification Version 1.2—Level 2 Revision 103," Trusted Computing Group, Inc., Jul. 9, 2007, 330 pages.

"TPM Main: Part 1 Design Principles—Specification Version 1.2—Revision 116," Trusted Computing Group, Inc., Mar. 1, 2011, 184 pages.

"TPM Main: Part 2 TPM Structures—Specification Version 1.2—Revision 116," Trusted Computing Group, Inc., Mar. 1, 2011, 201 pages.

"TPM Main: Part 3 Commands—Specification Version 1.2—Revision 116," Trusted Computing Group, Inc., Mar. 1, 2011, 339 pages.

International Search Report and Written Opinion mailed Jun. 10, 2016, International Patent Application No. PCT/US2016/024292, filed Mar. 25, 2016.

* cited by examiner

| Timestamp | Task | Data | Status |
|---|---|---|---|
| ⋮ | ⋮ | ⋮ | ⋮ |
| 2015:03:14:09:26:53 | Delivery | Payload1<br>Route:(Coord_1;Coord2;...)<br>Reliance:((UAVID; MSG_TYPE; TS)...) | Complete |
| 2015:03:14:09:36:12 | Delivery | Payload2<br>Route:Coord_1;Coord_2;...<br>Reliance:((UAVID; MSG_TYPE; TS);...) | InProgress |
| 2015:03:14:09:36:12 | Return To Base | Route:(Coord_1;Coord_2;...)<br>Reliance:((UAVID; MSG_TYPE; TS);...) | Queued |
| ⋮ | ⋮ | ⋮ | ⋮ |

INFLUENCING ACCEPTANCE OF MESSAGES IN UNMANNED VEHICLES

CROSS REFERENCE TO RELATED APPLICATIONS

This application incorporates by reference for all purposes the full disclosure of: co-pending U.S. patent application Ser. No. 14/671,264, filed concurrently herewith, entitled "AUTHENTICATED MESSAGES BETWEEN UNMANNED VEHICLES," co-pending U.S. patent application Ser. No. 14/671,224, filed concurrently herewith, entitled "UNMANNED VEHICLE ROLLBACK," and co-pending U.S. patent application Ser. No. 14/671,161, filed concurrently herewith, entitled "UNMANNED VEHICLE MESSAGE EXCHANGE."

BACKGROUND

As the technology develops, the potential for unmanned vehicles, such as unmanned aerial vehicles (also referred to as "drones") grows. Unmanned vehicles are able to perform tasks, such as item delivery and data gathering, with efficiency and capabilities that previously were not possible. At the same time, the improvements in unmanned vehicle technology create issues that are difficult to solve. For example, unmanned vehicles may travel out of communication range of a transmitter that can transmit signals to control the unmanned vehicles. As a result, even if an unmanned vehicle is able to operate at least partially autonomously, communicating changes to an unmanned vehicle that is out of direct communication range can be difficult. As another example, the fact that a vehicle is unmanned increases vulnerability to malicious or other interference with the vehicle's operation as well as the ability to detect such interference or, generally, malfunction of an unmanned vehicle. As the size of a fleet of unmanned vehicles increases, the complexity of managing such issues and, generally, of managing the fleet increases accordingly.

BRIEF DESCRIPTION OF THE DRAWINGS

Various embodiments in accordance with the present disclosure will be described with reference to the drawings, in which:

FIG. 4 shows an illustrative example of a data structure which may be used to record tasks by an unmanned aerial vehicle in accordance with an embodiment;

DETAILED DESCRIPTION

Figure 1:
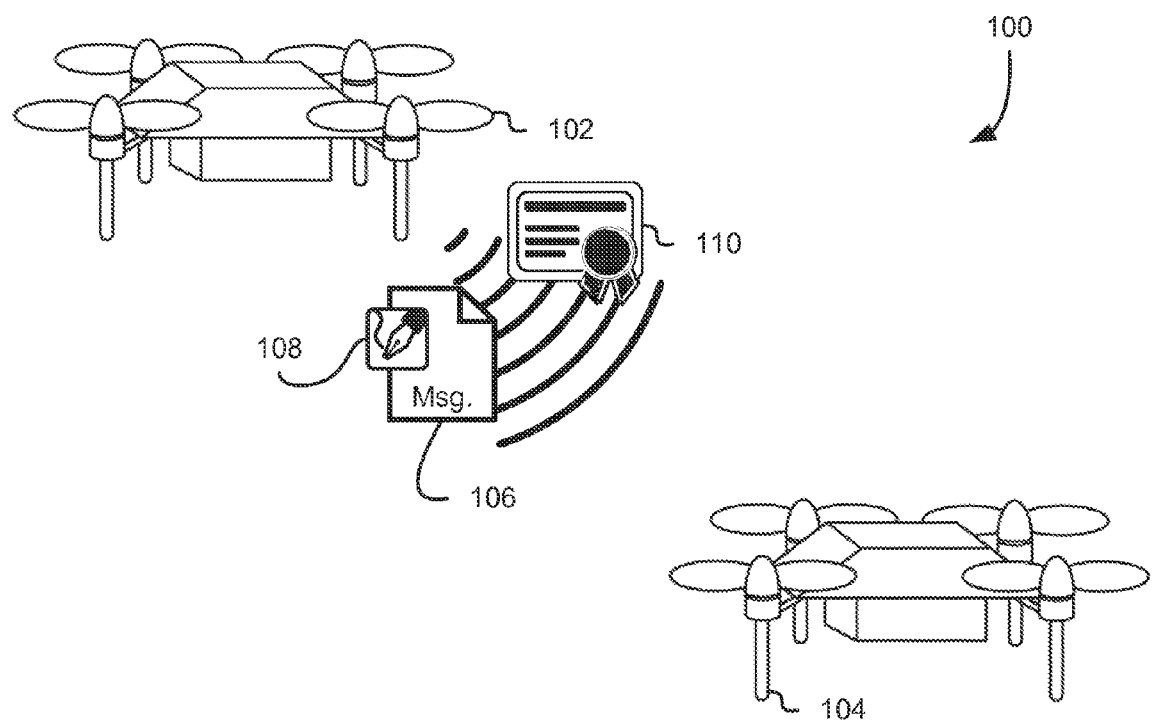
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enhanced communication among a fleet of unmanned aerial vehicles, commonly referred to as drones. The unmanned aerial vehicles may be part of a system that performs various services, such as parcel pickup and/or delivery, although other roles for unmanned aerial vehicles are within the scope of the present disclosure. In an embodiment, unmanned aerial vehicles are configured to perform various operations to pass messages among the fleet and make determinations whether to trust (e.g., operate according to) messages that are received.

In an embodiment, an unmanned aerial vehicle is configured with a digital certificate of a trusted computer system, such as a certificate authority operated by a service provider for which the unmanned aerial vehicle operates or another certificate authority trusted by the service provider. The unmanned aerial vehicle is also configured with a private cryptographic key of a public-private cryptographic key pair that the unmanned aerial vehicle maintains as a secret that is inaccessible outside of the unmanned aerial vehicle. The unmanned aerial vehicle may also be configured with a digital certificate for the private cryptographic key that can be used to obtain a public cryptographic key to verify digital signatures generated by the unmanned aerial vehicle. The digital certificate may be digitally signed using a private cryptographic key corresponding to the digital certificate of the certificate authority, enabling verification of authenticity of the digital certificate of the unmanned aerial vehicle. Other unmanned aerial vehicles of the fleet may also be configured with such a certificate and private cryptographic key (with each unmanned aerial vehicle so configured having a different private cryptographic key. As discussed in more detail below, such configuration allows the unmanned aerial vehicles to operate a secure mesh network.

During operation, such as during flight or at a home facility, an unmanned aerial vehicle may receive a message. The message may originate from a command and control center, which may utilize a command and control server to generate such messages, or may originate from another unmanned aerial vehicle. In some embodiments, the message may originate from one entity (e.g., command and control server or other unmanned aerial vehicle) but be received from another entity (e.g., an unmanned aerial vehicle that did not originate the message). The message may serve as an indicator to the unmanned aerial vehicle of information that the unmanned aerial vehicle can process to determine how to operate, whether such determination includes whether to add a new task or to modify an existing task. As an example, the message may encode a command to perform an operation (e.g., to fly to a specified location and to perform an action at the specified location). In some examples, the command is to delete information stored on the unmanned aerial vehicle which may, for instance, cause the unmanned aerial vehicle to delete information about what operations it is performing (e.g., a data structure as described below or other information encoding an operational plan), a log, a private cryptographic key, a certificate authority digital certificate, and/or other information. Such deletion may be a secure deletion whereby memory locations are overwritten with random or non-random (e.g. zeroes) data to prevent retrieval of information stored in memory.

As another example, the message may encode a command to change a route for a current or pending task. As yet another example, the message may encode weather data that the unmanned aerial vehicle can use to make an independent determination whether to change a route of a current or pending task or perform some other operation, such as aborting a current task (e.g., when inclement weather exists at a destination for a task). As yet another example, the message may encode information about a hazard in a specified location that enables the unmanned aerial vehicle to reroute to avoid the hazard or to abort a current or pending task (e.g., because the hazard is at or near (within a threshold proximity) of a destination of the task. Other messages may relate to the trustworthiness of other unmanned aerial vehicles. For example, a message may indicate whether a certificate of another unmanned aerial vehicle has been revoked and, as a result, at least some messages from the other unmanned aerial vehicle should not be relied upon. Other messages may also be used in various embodiments.

In various implementations, for an unmanned aerial vehicle to transmit a message to another unmanned aerial vehicle, the unmanned aerial vehicle obtains the message (e.g., by generating the message or receiving the message from another source), uses its private cryptographic key to digitally sign the message, thereby generating a digital signature of the message. The unmanned aerial vehicle may then transmit to the other unmanned aerial vehicle the message, the digital signature, and a copy of its digital certificate to enable the other unmanned aerial vehicle to verify the authenticity of the message and operate accordingly. To verify the authenticity of the message, the unmanned aerial vehicle that receives the message, digital signature, and digital certificate, the unmanned aerial vehicle may perform a set of operations to verify the authenticity of the digital certificate and, in turn, verify authenticity of the message using the digital signature, and operate accordingly. In example embodiments, for at least some types of messages, the digital signature, the digital certificate, and the message must all be cryptographically verified as authentic for the unmanned aerial vehicle to trust the message.

The manner by which an unmanned aerial vehicle processes messages it receives may vary in accordance with various embodiments and in accordance with the types of messages that are received. For example, in some embodiments, an unmanned aerial vehicle receives a message indicating a hazard in a particular location, such as inclement weather conditions, a man-made hazard (e.g., a person attempting to physically harm an unmanned aerial vehicle using projectiles), poor wireless communication conditions, authority-imposed restrictions on flying over an area, and/or other information rendering avoidance of an area. The message may, for instance encode a set of coordinates defining an area, a single coordinate and a radius of a circle to be centered around the coordinate, an identifier of a pre-defined area, or other information usable by the unmanned aerial vehicle to identify the area to avoid. The unmanned aerial vehicle may, upon successful verification of authenticity of a received message, modify a current task to reroute to avoid the area. The unmanned aerial vehicle can also modify a pending task (e.g., a task in a queue of tasks) to also avoid the area or may save the message to be processed at a later time, such as when the pending task becomes or is about to become a current task. Later processing for pending tasks may include determining whether the task was superseded by any later-received messages or other processing, such as discussed below.

In some examples, processing of a received message by an unmanned aerial vehicle may indicate to the unmanned aerial vehicle that messages from another unmanned aerial vehicle are untrusted. As an example, the message may include an identifier of the unmanned aerial vehicle (which may be in the form of an identifier of a digital certificate of the unmanned aerial vehicle, which may be a fingerprint of the unmanned aerial vehicle's certificate) and information indicating revocation of the digital certificate of the unmanned aerial vehicle subject to the revocation. As another example, the digital signature of the message or of the certificate may be invalid, indicating a problem with the unmanned aerial vehicle from which the message was received.

As a result of detecting untrustworthiness of an unmanned aerial vehicle as a result of receiving a message, the unmanned aerial vehicle that received the message may process messages that it previously received and stored and may limit processing to messages that can potentially affect the unmanned aerial vehicle's operation (e.g., by limiting to messages regarding current or future tasks). For instance, if a previous message caused change to a task, the unmanned aerial vehicle may roll back the change or recalculate information for the task (e.g., a route) so that the task is independent of the message of the untrustworthy unmanned aerial vehicle. Whether a current or previous message is relied upon when that message is from an unmanned aerial vehicle that is determined to be untrustworthy may depend on the type of message. For instance, messages with weather data may be relied upon or at least considered (i.e., compared with weather data for a nearby area from another unmanned aerial vehicle) while messages that may cause harmful and/or irrevocable actions (e.g., dumping a payload at a place that is not an intended destination for the payload) may not be relied upon.

As another example, unmanned aerial vehicles may process messages by voting on the messages. As an illustrative example, an unmanned aerial vehicle may receive a message with weather data for an area. The unmanned aerial vehicle may, if it has weather data for the same area (e.g., or an area within some threshold proximity of the area), compare the received weather data with its own weather data (e.g., by comparing respective field values for the weather data and determining whether the difference for each respective value is within a threshold) and, if the received weather data is close enough to its own weather data, add a vote of confidence to the received message. Distance for the purpose of comparing weather data may be calculated using any suitable metric, such as maximum coordinate difference or a Euclidean distance (e.g., true Euclidean distance, normalized Euclidean distance, or harmonically summed Euclidean distance) between two sets of weather data treated as vectors. Generally, any way by which data sets may be compared and which determinations of whether to add a vote of confidence to data is considered as being within the scope of the present disclosure. The vote of confidence may, for example, be added by digitally signing the message or a portion thereof (e.g., an identifier of the message) using the unmanned aerial vehicle's private cryptographic key. Other information may be included instead of or in addition to a digital signature, such as a value between zero and one of the confidence of the vote and, in some examples, the other information may be included in the information that is digitally signed.

The message, with the additional digital signature, may then be transmitted to one or more other unmanned aerial vehicles that may, if having applicable weather data, perform a similar process to add a vote. In some embodiments, votes are only positive (i.e., an unmanned aerial vehicle may influence acceptance of a message by voting on the message or not voting on the message) while, in other embodiments, votes can be positive or negative. For instance, an unmanned aerial vehicle may add a negative vote, if one or more field values for its own weather data differs from respective fields in the received weather data and that is within a time threshold of the received weather data or is more recent than the received weather data (or both), the unmanned aerial may add information indicating a negative vote and digitally sign that information. In some examples, when an unmanned aerial vehicle does not add a positive vote to a message, it refrains from retransmitting that message.

When an unmanned aerial vehicle receives a message, the manner by which the unmanned aerial vehicle processes the message may depend on votes the message has received as it has passed from unmanned aerial vehicle to unmanned aerial vehicle. For instance, changing a current task may require a threshold number of votes. Similarly, an unmanned aerial vehicle that receives a message with votes may have different operations that it performs for different numbers of votes. As an example, the unmanned aerial vehicle may transmit a request to a command and control center or to another unmanned aerial vehicle to confirm or otherwise vet the message (e.g., by adding votes) in an attempt to determine whether enough votes can be obtained and, if a threshold confidence is obtained, the unmanned aerial vehicle may change one or more tasks.

Various optimizations may be applied to the techniques described above and in more detail below. For example, in some implementations, unmanned aerial vehicles maintain logs of messages they have received along with other relevant information (e.g., digital signatures and certificates or identifiers of certificates). When an unmanned aerial detects an ability to communicate with another unmanned aerial vehicle, the unmanned aerial vehicles may exchange message logs or portions thereof (e.g., messages received within some specified amount of time, also referred to as a message log). When an unmanned aerial vehicle receives a message with a message log from another unmanned aerial vehicle, the unmanned aerial vehicle that received the message log may combine (e.g., merge) the message log with its own message log and process any messages that it has not yet processed, such as described above. For example, the unmanned aerial vehicle may use any received messages to roll back any actions it has taken and/or modify one or more pending and/or active tasks in accordance with the messages it received. The processing of the new messages may proceed in chronological order so that more recent messages can override effects of older messages. Other techniques, many of which are described explicitly below, are also within the scope of the present disclosure.

FIG. 1 shows an illustrative example of an environment 100 in which various embodiments can be practiced. In the environment 100, an unmanned aerial vehicle 102 communicates with another unmanned aerial vehicle 104. The unmanned aerial vehicle 102 may, for example, communicate data that the unmanned aerial vehicle 102 has corrected using a set of sensors on board. As another example, unmanned aerial vehicle 102 may have one or more messages from one or more other unmanned aerial vehicles and may be relaying one or more of the messages to the other unmanned aerial vehicle 104.

As discussed in more detail below, various embodiments of the present disclosure relate to secure communications between unmanned aerial vehicles such as the unmanned aerial vehicle 102 and the unmanned aerial vehicle 104 illustrated in FIG. 1. To do this, in an embodiment, the unmanned aerial vehicle 102 transmits a message 106 to the unmanned aerial vehicle 104. The message may be a structured collection of information configured in a manner that the unmanned aerial vehicle 104 is configured to process. As noted above, the message may contain weather data, a command, information about other unmanned aerial, and/or generally information that is potentially applicable to the operation of the unmanned aerial vehicle 104 or one or more other unmanned aerial vehicles not illustrated in the figure.

In various implementations, messages between unmanned aerial vehicles employ cryptographic techniques to enable determinations of whether such messages should be trusted where operation of an unmanned aerial vehicle relating to a message may depend on whether the message is trusted. In this particular example, the message 106 from the unmanned aerial vehicle 102 to the unmanned aerial vehicle 104 is provided with a digital signature 108 of the message 106. In various embodiments, the message 106 is digitally signed using a private cryptographic key of a public-private cryptographic key pair where a private cryptographic key may be cryptographic material maintained securely as a secret within a hardware component, such as a trusted platform module (TPM) or other component providing hardware protection of the unmanned aerial vehicle 102. It should be noted that while asymmetric cryptographic techniques are discussed throughout for the purpose of illustration of specific embodiments, the techniques described herein are adaptable to the use of symmetric cryptographic algorithms, such as algorithms utilizing secrets shared between unmanned aerial vehicles. Generally, the techniques of the present disclosure extend to techniques where cryptographic material specific to an unmanned aerial vehicle and held as a secret by the unmanned aerial vehicle is used to render messages cryptographically verifiable by other unmanned aerial vehicles that have access to either the cryptographic material or information that corresponds to the cryptographic material (such as a public cryptographic key when the private cryptographic key is the cryptographic material). Note that, while embodiments of the present disclosure discuss digital signatures (both symmetric and asymmetric) being used for authentication of messages, other authentication information may be used to verify authenticity of a message. As an example, secret credentials themselves may be used to prove identity or other information that is usable to prove access to secret information, which may be cryptographic material. Generally, messages may be received with authentication information (e.g., digital signature or other proof of access to a credential) that is specific to an originator (e.g., unmanned aerial vehicle or command and control server) of the message and/or, if different than the originator, an entity that provided the message (e.g., the unmanned aerial vehicle from which the message was received when that unmanned aerial vehicle did not originate the message).

Returning to the illustrated embodiment of FIG. 1, the unmanned aerial vehicle 102 additionally transmits a digital certificate 110 to the unmanned aerial vehicle 104 where the digital certificate 110 enables the unmanned aerial vehicle 104 to determine a public cryptographic key corresponding to the private cryptographic key stored within the unmanned aerial vehicle 102 and to use the public cryptographic key to verify the digital signature 108 of the message 106. As discussed below, the digital certificate 110 may contain a digital signature of a certificate authority (i.e., a computer system that issues digital certificates by cryptographically binding digital certificates to respective identities (e.g., individual unmanned aerial vehicles)) that the unmanned aerial vehicle 104 is configured to trust. The unmanned aerial vehicle 104 may have a digital certificate of the certificate authority that issued the digital certificate 110, thereby enabling the unmanned aerial vehicle 104 to determine that the public cryptographic key of the digital certificate 110 can be trusted to verify the digital signature 108.

The unmanned aerial vehicle 104, as noted, may be configured to operate in accordance with whether a message received from unmanned aerial vehicle is cryptographically verified as trustworthy. Accordingly, depending on whether the unmanned aerial vehicle 104 successfully authenticates the message 106 by a successful determination of validity of the digital signature 108, the unmanned aerial vehicle 104 may perform various operations. For instance, the unmanned aerial vehicle 104 may operate in accordance with a first set of executable instructions as a result of determining that the message 106 is authentic and trustworthy. The unmanned aerial vehicle 104 may execute another set of executable instructions as a result of the unmanned aerial vehicle 104 determining that the message 106 is not trustworthy. As discussed in more detail below, the various ways in which the unmanned aerial vehicle 104 can process trustworthy or untrustworthy messages may vary in accordance with various embodiments and in accordance with the specific capabilities of the unmanned aerial vehicle with which the various techniques of the present disclosure are being used.

Note that, while unmanned aerial vehicles are used extensively throughout for the purpose of illustration, the techniques of the present disclosure apply to unmanned vehicles, in general, where an unmanned vehicle is a vehicle that is able to travel to a specified destination autonomously (e.g., without human intervention after dispatch). Unmanned vehicles do not necessarily fly and include, but are not limited to, land-based vehicles (e.g., cars, trucks, and other automobiles), rail-based vehicles (e.g., trains), aqueous vehicles (e.g., boats and submarines), different types of air vehicles (helicopters, airplanes, and the like), and/or other types of vehicles. Note that unmanned vehicles, in some implementations, may have a human operator for at least some operation and/or for overriding of automated systems. For instance, a passenger vehicle may be considered an unmanned vehicle even though a passenger may be able to override automated controls.

Figure 2:
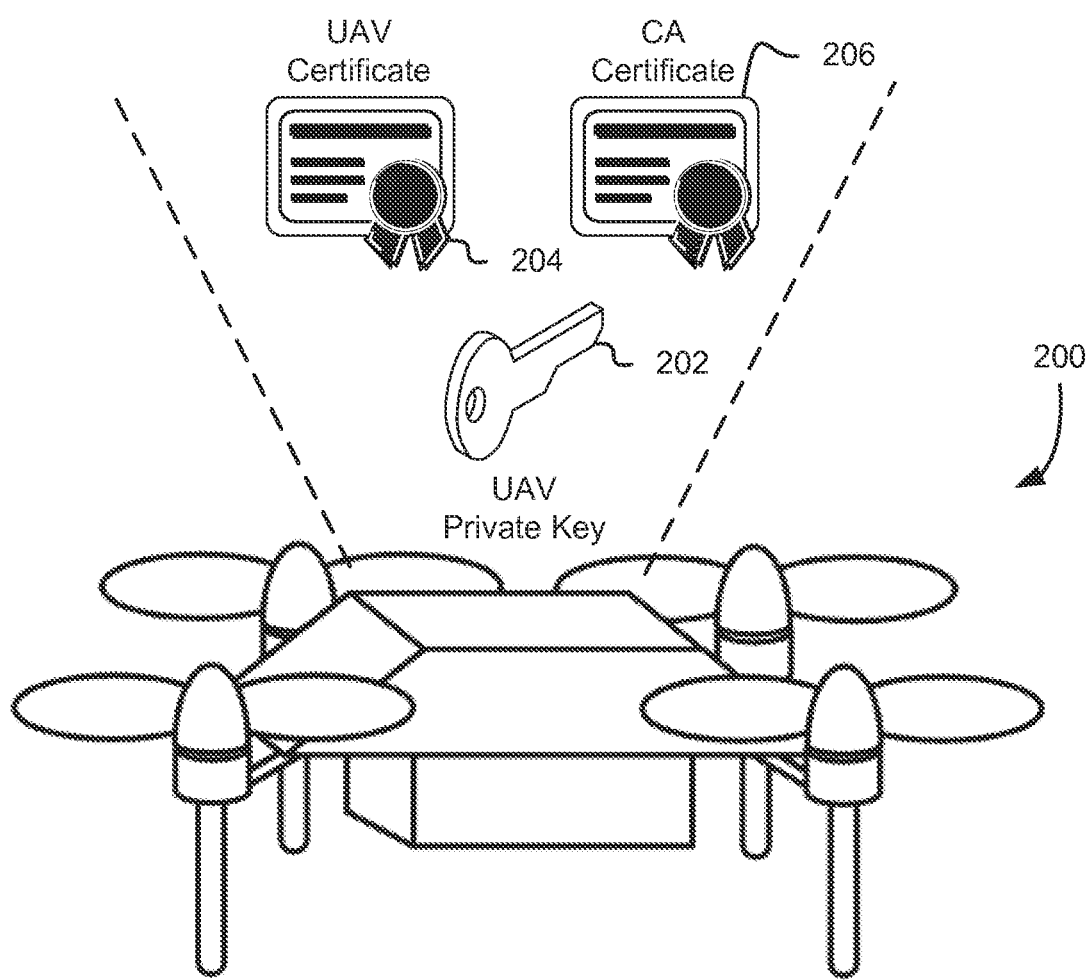
FIG. 2 shows an illustrative example of an unmanned aerial vehicle in accordance with an embodiment.

FIG. 2 shows an illustrative of an unmanned aerial vehicle 200 and information that the unmanned aerial vehicle 200 may utilize to employ various techniques described herein. The unmanned aerial vehicle may be an unmanned aerial vehicle, such as described above, in connection with FIG. 1. As illustrated in the figure, the unmanned aerial vehicle 200, in this example, includes various components that enable the unmanned aerial vehicle 200 to fly or otherwise travel and/or other components, such as described below. In an embodiment, as illustrated in FIG. 2, each unmanned aerial vehicle 200 of a fleet of unmanned aerial vehicles has available (e.g., stored in memory) at least three pieces of information accessible to one or more processors of the unmanned aerial vehicle 200, as discussed below. In this particular example, one of the items the unmanned aerial vehicle 200 stores is an unmanned aerial vehicle private cryptographic key 202 where an unmanned aerial vehicle private cryptographic key 202 may be a private cryptographic key corresponding to a public cryptographic key for a public-private cryptographic key pair. The public cryptographic key corresponding to the unmanned aerial vehicle private cryptographic key 202 may be encoded in or otherwise specified by an unmanned aerial vehicle digital certificate 204. The unmanned aerial vehicle certificate may be a structured collection of data that includes or otherwise specifies the public cryptographic key. In some embodiments, the unmanned aerial vehicle digital certificate and other digital certificates described herein are X.509 certificates, although, other ways of encoding a public cryptographic key are considered as being within the scope of the present disclosure.

As noted above, the unmanned aerial vehicle private cryptographic key 202 can be used to generate digital signatures for messages such as digital signatures of the messages themselves and/or digital signatures of other information (e.g., identifiers of messages, which may be hashes of the messages). Generally, a digital signature for a message is information generated using a secret credential (e.g., private cryptographic key) that is cryptographically verifiable as cryptographically bound to the message. The public cryptographic key of the unmanned aerial vehicle certificate 204 can be used to verify whether digital signatures generated using the unmanned aerial vehicle private cryptographic key 202 are valid. However, in various contexts, validity of digital signature is not enough to ensure the security of data passed between unmanned aerial vehicles. Accordingly, in an embodiment, the unmanned aerial vehicle 200 additionally stores a certificate authority digital certificate 206, which is a digital certificate with a public cryptographic key that is usable to verify a digital signature of the unmanned aerial vehicle digital certificate 204, where such a digital signature may have been generated using a private cryptographic key held as a secret by the certificate authority.

It should be noted that each unmanned aerial vehicle of a fleet of unmanned aerial vehicles may have a different respective private cryptographic key and corresponding digital certificate useable to verify digital signatures generated using the respective private cryptographic key. However, each unmanned aerial vehicle may store the same copy of the certificate authority certificate 206 or, generally, copies of the public cryptographic key encoded by the certificate authority certificate 206 if the digital certificates themselves vary among the unmanned aerial vehicles of a fleet. Further, individual unmanned aerial vehicles may store multiple different certificate authority digital certificates, where a single certificate authority digital certificate may be insufficient for verifying all digital certificates of unmanned aerial vehicles in a fleet. In this manner, when the unmanned aerial vehicle 200 receives a message from another unmanned aerial vehicle, the unmanned aerial vehicle may verify trustworthiness of a digital signature included with the message.

In various embodiments, receipt of a message also includes receipt of a digital signature of the message and a digital certificate for use in verifying the digital signature of the message. Thus, the unmanned aerial vehicle 200 can use the received digital certificate, which is a public key encoded in, or otherwise specified by, the received digital certificate, to verify the digital received signature. The unmanned aerial vehicle 200 may use its own copy of the certificate authority digital certificate 206 to verify a digital signature of the received digital certificate. If both the digital signature of the received digital certificate and the digital signature of the message are valid, the unmanned aerial vehicle 200 may operate in accordance with the received message being trustworthy. Similarly, if one or both of the digital signature of the received digital certificate, and the digital signature of the message are determined to be invalid, the unmanned aerial vehicle 200 may operate in accordance with the message not being trustworthy.

Note that, while FIG. 2 illustrates a particular implementation, other implementations are considered as being within the scope of the present disclosure. For example, in some embodiments each unmanned aerial vehicle of a fleet of unmanned aerial vehicles maintains a local copy of all digital certificates specific to the different unmanned aerial vehicles of the fleet. When a digitally signed message is received by the unmanned aerial vehicle, the unmanned aerial vehicle may perform a lookup of a matching digital certificate and may use that matching digital certificate to verify a digital signature. If the local copy of the digital certificate has previously been verified, the unmanned aerial vehicle may, in this alternate embodiment, trust messages with valid digital signatures without utilizing a certificate authority certificate. To select the matching digital certificate, an identifier, such as an unmanned aerial vehicle identifier or a digital fingerprint of the digital certificate that may be included with the message. Other variations are also considered as being within the scope of the present disclosure.

Figure 3:
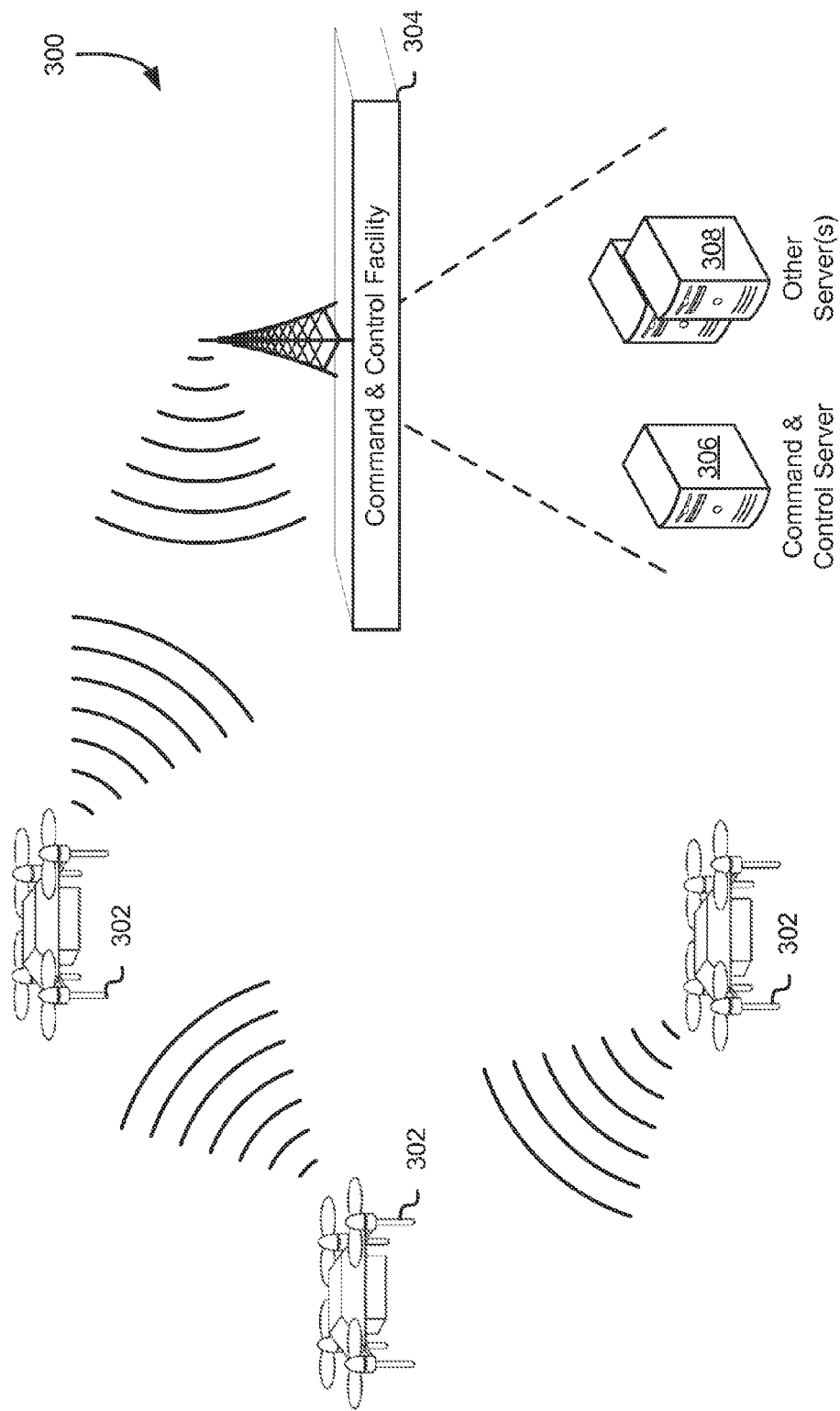
FIG. 3 shows an illustrative example of an environment that includes a fleet of unmanned aerial vehicles in accordance with an embodiment.

FIG. 3 shows an illustrative example of an environment 300 in which various embodiments can be practiced. In this particular example, the environment 300 includes a fleet of unmanned aerial vehicles 302. When within range, which may depend on the particular wireless communications techniques utilized in specific embodiments, unmanned aerial vehicles 302 may communicate with a command and control facility 304.

A command and control facility 304 may be a facility that is equipped with a computer system and communication devices for communicating with unmanned aerial vehicles 302. The specific configuration of a commanding control facility 304 may vary in accordance with various embodiments. In some examples, the command control facility is a component of a warehouse from which unmanned aerial vehicles take physical goods (or physical items storing digital goods) for delivery at their destinations. The goods may be, for example, goods that were ordered in an online electronic marketplace. It should be noted that the unmanned aerial vehicles 302 may vary substantially, in accordance with different embodiments, and are not limited to unmanned aerial vehicles used for the delivery of physical goods ordered in an electronic marketplace. For example, in some instances the unmanned aerial vehicles 302 are used to deliver physical goods that were not specifically ordered, such as, samples, relief supplies, or generally any type of physical items dispatched using the unmanned aerial vehicles 302 for various reasons. Unmanned aerial vehicles may also be used for other tasks, in addition to, or instead of, the delivery of physical items. For example, many unmanned aerial vehicles 302 are equipped with cameras that can record audio and/or visual data, such as, electronic photographs and/or video. Such unmanned aerial vehicles may be used, for instance, for surveying terrain, for gathering information, for journalistic purposes, for assessing a threat, and/or otherwise gathering information that may be otherwise more difficult to gather.

In an embodiment, the command and control facility 304 includes a command and control server 306 which may be a server computer system configured to generate electronic messages and cause the transmission of the generated electronic messages to unmanned aerial vehicles 302 using a wireless communications protocol that the unmanned aerial vehicles are configured to utilize. The command and control server 306 may also receive electronic messages transmitted from unmanned aerial vehicles 302 and may process the messages accordingly, which may include transmission to other computer systems for processing. To enable the unmanned aerial vehicles 302 to make determinations whether messages from the command and control server 306 are trustworthy, the command and control server may utilize various techniques described herein as being used by unmanned aerial vehicles such as by digitally signing messages and providing messages with digital signatures and digital certificates useable to verity the digital signatures. For example, some message types may require origination from the command and control facility (or a particular entity thereof, such as a specific server) before such messages are processed (e.g., commands in the messages are fulfilled), even though such messages may be relayed through one or more unmanned aerial vehicles. For instance, a command to add a task may be required, in some embodiments, to originate from a command and control facility, thereby preventing a compromised and/or malfunctioning unmanned aerial vehicle from successfully causing some commands to be fulfilled. The techniques described herein can be used to cryptographically verify that certain message types do, in fact, originate from the command and control facility.

The command and control server 306 may transmit messages that assign tasks to unmanned aerial vehicles 302 that provide data to unmanned aerial vehicles 302, such as, weather data, or threat data (i.e., data that identifies a threat to unmanned aerial vehicles 302 that has been reported, such as a person acting maliciously), data about the trustworthiness of individual unmanned aerial vehicles (such as, information indicating revocation of unmanned aerial vehicle digital certificates), data identifying no-fly zones (e.g., areas where authorities have prohibited flying, at least temporarily) and/or other information.

As illustrated in FIG. 3, the command and control facility may also include one or more other servers 308, which may be configured in accordance with the specific requirements of various embodiments. For instance, in a warehouse embodiment, one or more other servers 308 may be configured to facilitate management of items in the warehouse, such as, by providing information about the location of items in the warehouse to match orders that have been received. For example, the one or more other servers 308 may receive information from a distributed computer system associated with the command and control facility, such as an electronic marketplace, and may communicate with the command and control server 306 to cause unmanned aerial vehicles 302 to participate in fulfillment of orders or otherwise to participate in various tasks for the unmanned aerial vehicles 302. Generally, the other server(s) may be configured in accordance with operations of an organization for which the unmanned aerial vehicles operate.

FIG. 4 shows an illustrated example of a data structure 400 that may be used by unmanned aerial vehicles in accordance with various embodiments. In this particular example, the data structure has the form of a table, whose rows may be used in a queue. In this example, the data structure 400 includes various columns corresponding to different types of information associated with tasks for an unmanned aerial vehicle that stress the data structure 400. As an example, a first row of the data structure 400 corresponds to time stamps where an entry in a row of the time stamp column corresponds to a time stamp for when the task corresponding to the row was received by the unmanned aerial vehicle or when the task was generated (e.g., by a command and control server).

A second column is used for identifiers of tasks that have been assigned to the unmanned aerial vehicle. In this particular example, an entry in the task column corresponds to one of two different tasks which in this example are delivery tasks and "return to base" (e.g., a task involving travelling from a remote location to a command and control facility) tasks. It should be noted that the types of tasks performed by an unmanned aerial vehicle can vary in accordance with various embodiments and do not necessarily include the delivery of physical items. For example, a task for an unmanned aerial vehicle may be to travel to a location and record audio and/or visual information. As another example, a task for an unmanned aerial vehicle may be to travel to a specified location and play an audio file through a speaker system of the unmanned aerial vehicle. Other tasks are also considered as being within the scope of the present disclosure. Note that, by organizing operations into tasks, the data structure 400 encodes an operational plan for an unmanned aerial vehicle, where an operational plan, in an embodiment, comprises an ordered set of operations to perform. In this example, the operational plan is encoded as an ordered set of tasks (e.g., ordered by row) comprising all uncompleted (e.g., pending and to be performed in the future) tasks. Note, however, that an operational plan does not necessarily need to be organized by task but may, for instance, be organized on a more granular level (e.g., by individual operation) or a less granular level (e.g., by groups of tasks).

A third column in the example data structure 400 of FIG. 4 is used for data about various tasks that an unmanned aerial vehicle may have received as a result of being assigned. In this particular example, the type of data for a particular task may vary in accordance with the type of task. In this example, delivery tasks include information specifying one of several payloads the unmanned aerial vehicle may individually deliver. The data may also include data for a route, which may comprise a sequence of coordinates (e.g., global positioning service coordinates) for the unmanned aerial vehicle to follow to a destination. Routes may be identified by their coordinates or in other ways, such as by identifiers of pre-stored routes.

The data in the data column may also include information about any messages that the unmanned aerial vehicle relied upon in connection with acceptance of the task. Such reliance information may include, for example, an identifier of an unmanned aerial vehicle from which a message was received, or a type of message that was received (e.g., whether the message had a command, had weather data, had hazard data, had data about revocation of a digital certificate of another unmanned aerial vehicle, or other data). The reliance data may also include a time stamp of the message that was received. The time stamp may be, for example, a time stamp of when the message was generated. Other information may also be included, such as the message itself, a digital signature of the message that was received, and/or any metadata associated therewith. As illustrated in FIG. 4 reliance data for a task may be stored for multiple messages that were received by the unmanned aerial vehicle. For instance, a route of a task may have been calculated as a result of receiving weather data from multiple unmanned aerial vehicles. One unmanned aerial vehicle may have provided information about weather from one location while another unmanned aerial vehicle may have provided information about weather of another location. Other information that is included with the reliance data may be data that identifies how data from another unmanned aerial vehicle was used (e.g., identifying that the data was used to update a route to a destination). Generally, the reliance data for a task includes data that enables an unmanned aerial vehicle to determine whether the task was determined using information received from another unmanned aerial vehicle and, in some embodiments, to determine the unmanned aerial vehicle that provided the information. Note that reliance data may be associated with information for other levels of granularity, such as individual operations or for individual components of operations and/or tasks. For instance, reliance data may be associated with a route and thereby be indirectly associated with a task that utilizes that route. Other variations are also within the scope of the present disclosure.

Finally, as illustrated in FIG. 4, a fourth column of the data structure 400 includes a status identifier for each task. In this particular example, each entry in the status column is one of three possibilities: complete, in progress, and queued. A task with a complete status identifier may be a task that the unmanned aerial vehicle has already performed. An in-progress task status identifier may indicate that a task is currently being performed by the unmanned aerial vehicle. As illustrated in FIG. 3, for instance, the unmanned aerial vehicle may be on route to make a delivery. A queued status identifier for a task may indicate that the task has been recorded to be performed after the completion of one or more other tasks. Other data may also be stored in the data structure 400 and the particular types of information illustrated in FIG. 4 are provided for the example of a single embodiment. For instance, some completed tasks may be reversible (e.g., a delivery may be reversed by locating and regaining control of a payload) and whether a task is reversible may be included in the data structure 400.

Other variations are also considered as being within the scope of the present disclosure. For example, in some embodiments the data structure may not include information in rows for tasks that have been completed. However, storage of information corresponding to completed tasks may be useful in various embodiments such as for the recording of statistical information regarding tasks that were performed. Other information that may be included in the data structure 400 may include a time stamp of completion of a task, information obtained from sensors during performance of the task, such as weather data, one or more digital images of one or more locations traveled to as part of the task and/or other information that may be relevant to specific embodiments. In the particular example of FIG. 4, the data structure is configured as a table that is usable as a queue. Tasks are ordered from top to bottom in accordance with an order in which the tasks are due to be performed. The highest row having a task status that is not complete may correspond to an in-progress task or a task that has yet to be begun and any subsequent rows may correspond to tasks that have been queued.

As noted above unmanned aerial vehicles may utilize various sensors for the recording of information during their operation. Such information may be referred to as operational data. An example of such operational data includes weather data that may include, but is not limited to, temperature data, wind speed data, barometric pressure data, precipitation data, and/or other data relevant to weather. Global positioning system (GPS) data may also be considered to be operational data. Other operational data includes data about systems of an unmanned aerial vehicle used for propulsion such as motor speed for each of multiple motors and/or orientation data such as pitch, roll, and yaw. A clock may also provide operational data in the form of time data used, for example, time stamps.

Operational data may also result from analysis of data collected by a set of sensors of an unmanned aerial vehicle. As an illustrative example, data about motor operation in conjunction with GPS data and altitude data may be used to determine whether an unmanned aerial vehicle has been subject to malicious human interference or has encountered an operational issue. For instance, prolonged motor operation, that is motor operation past a threshold without a change in altitude or GPS location, may indicate the unmanned aerial vehicle has been subject to interference (e.g., something preventing flight or preventing communication). Sensors, such as cameras, along with facial recognition algorithms may be used to determine whether a human is present and thereby enabling determinations of whether interference is human interference or nonhuman interference. Nonhuman interference may be, for example, an unmanned aerial vehicle being engaged with a tree or other structure that prevents the unmanned aerial vehicle from flying. Operational data may also include audio and/or visual data such as audio and photographs and/or video of a surrounding environment to be used for various purposes such as forensic identification of humans maliciously interfering with operation of an unmanned aerial vehicle and/or, generally, information about an environment to enable troubleshooting.

Figure 5:
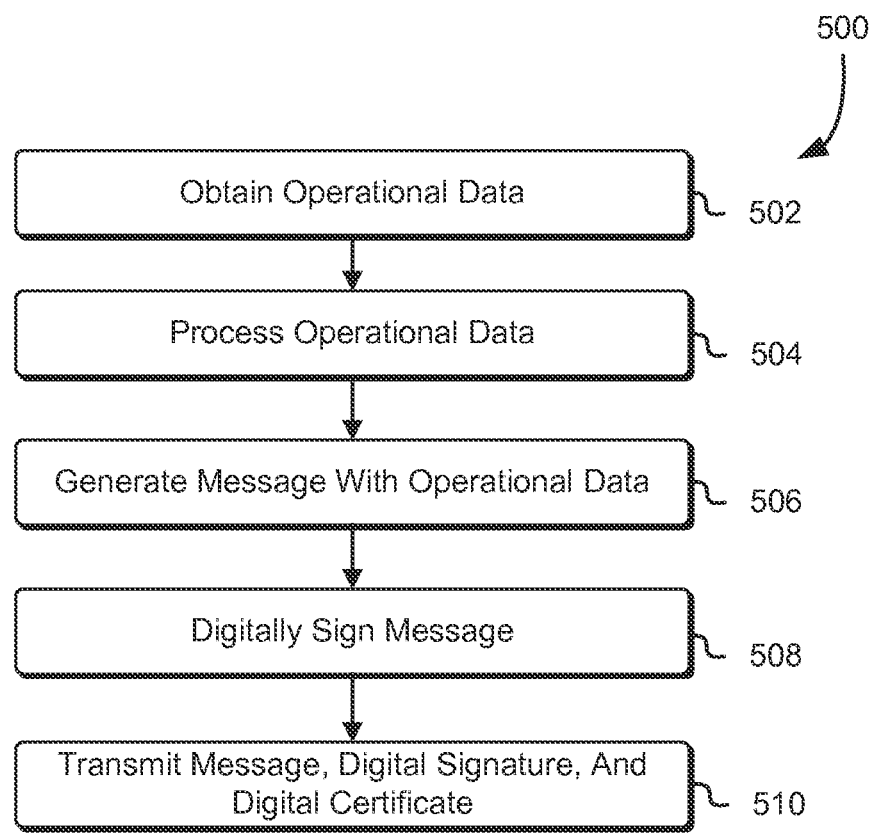
FIG. 5 shows an illustrative example of a process for transmitting a message in accordance with an embodiment.

FIG. 5 shows an illustrative example of a process 500 that may be used to process operational data in accordance with an embodiment. The process 500 may be performed by an on-board (also referred to as an "onboard") computer system of an unmanned aerial vehicle. In an embodiment, the process 500 includes obtaining 502 operational data. As noted above, operational data may be obtained from various sensors with which the unmanned aerial vehicle performed the process 500 is equipped and/or by processing data obtained by the set of sensors. Having obtained 502 the operational data, the unmanned aerial vehicle performing the process 500 may process 504 the operational data. As noted above, operational data may be processed in various ways in accordance with various embodiments, many examples of which are described herein, but it should be noted that embodiments of the present disclosure are not limited to the embodiments explicitly stated therein. Generally, processing 504 the operational data includes performing an analysis of the date in accordance with executable instructions to determine if and/or how to change operation. In some examples, processing the operational data involves determining that the unmanned aerial vehicle performing the process 500 has been compromised (e.g., because of prolonged motor operation without a sufficient change in location and/or facial recognition algorithms detecting faces in close proximity, or because of sensors indicating intrusion into a housing of the unmanned vehicle). Upon detecting such a compromise, the unmanned aerial vehicle may generate and digitally sign a message revoking its own digital certificate and, if possible, transmit that message to one or more other unmanned aerial vehicles and/or a command and control facility. An unmanned aerial vehicle that receives such a self-revocation may verify authenticity of the message (despite the revocation) and process accordingly (e.g., by rejecting at least some future messages not digitally signed to be verifiable with an unrevoked digital certificate, modifying an operational plan dependent on messages from the unmanned aerial vehicle that self-revoked its digital certificate, and the like). In some examples, the self-revocation (or, generally, revocations that are not self-generated) may specify an effective time so that any pending tasks reliant on messages from the unmanned aerial vehicle whose digital certificate was revoked can be selectively reprocessed (e.g., by selecting only those tasks reliant on messages from the unmanned aerial vehicle, verifiable using a revoked digital certificate, and received and/or generated after the revocation).

In various embodiments, operational data is useful to not only the unmanned aerial vehicle that collected the operational data, but to other unmanned aerial vehicles. As an example, weather data collected by an unmanned aerial vehicle may be useful to another unmanned aerial vehicle that is scheduled to travel to a location where inclement weather has been recorded. As another example, an unmanned aerial vehicle that has detected interference with the unmanned aerial vehicle's operation, whether the interference be human interference or otherwise, may be useful to an unmanned aerial vehicle that is scheduled to travel to or near the destination where the interference was detected. Other examples of use of operational data collected by another unmanned aerial vehicle are considered as being within the scope of the present disclosure.

To enable other unmanned aerial vehicles to utilize operational data, the process 500 may include generating 506 a message that encodes the operational data. The message may be structured in a manner enabling processing of the operational data by other unmanned aerial vehicles that receive the message. Having generated 506 the message the unmanned aerial vehicle performing the process 500 may digitally sign the message. The unmanned aerial vehicle may, for instance, perform a cryptographic digital signature algorithm using a private cryptographic key accessible to the unmanned aerial vehicle. Having digitally signed 508 the message the unmanned aerial vehicle may transmit 510 the message, the digital signature, and a digital certificate encoding a public key corresponding to the private cryptographic key used to digitally sign the message. The combination of message digital signature and digital certificate may be referred to as a message package that also may include other information in addition to those items listed. Note that the unmanned aerial vehicle may also, in some examples, store the message it generated 506, for its own use, or for providing (either individually or in a log, such as described below) to other unmanned aerial vehicles as they appear within communication range.

Note that additional operations may be performed while performing the process 500 and variations thereof. For instance, in some embodiments, an unmanned aerial vehicle's logic for performing the process 500 includes logic for determining whether to transmit the message to another unmanned aerial vehicle. As an example, if the operational data includes weather data for a location, the unmanned aerial vehicle may determine whether to transmit the weather data to another unmanned aerial vehicle that is further from the location, outside of a specified radius of the location, or otherwise is less likely to utilize the weather data. To make such determinations, the unmanned aerial vehicle may receive location information from other unmanned aerial vehicles and/or may utilize its own sensors (e.g., by determining that it has weather data for a location that it is currently far away from).

Note also that, as with all transmissions of messages described herein, the unmanned aerial vehicle performing the process 500 may transmit the message package in various ways. For instance, in some embodiments, the unmanned aerial vehicle completes a handshake process (e.g., to establish a communications channel, which may be an encrypted communications channel) with the other unmanned aerial vehicle and transmits the message after establishing the channel. In other examples, the unmanned aerial vehicle broadcasts the message package and any unmanned aerial vehicles within range of the broadcast may receive and process the message package. In some embodiments, some types of messages are broadcast while others are reserved for communications in established pairwise communications channels.

Figure 6:
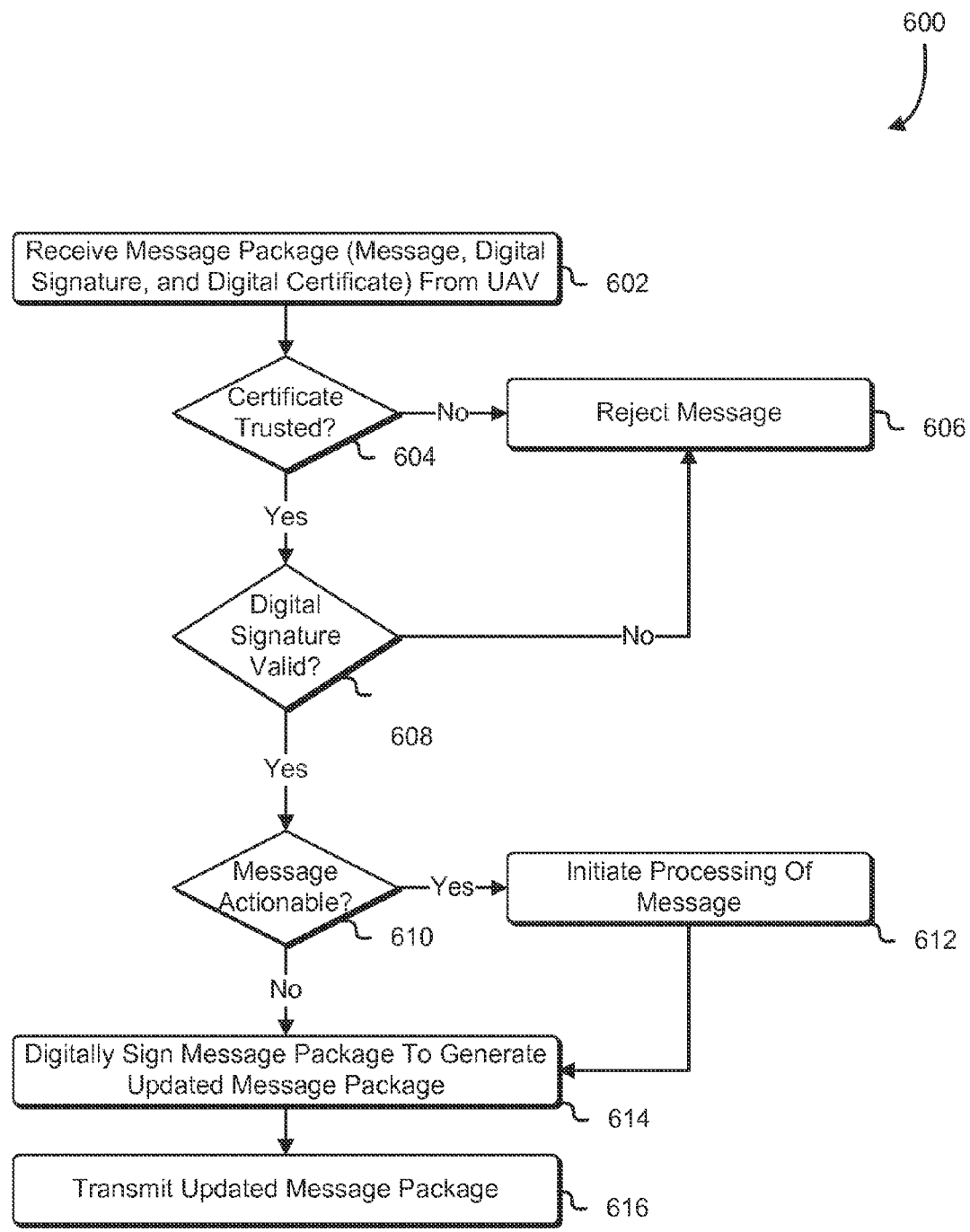
FIG. 6 shows an illustrative example of a process for processing a message that is received in accordance with an embodiment.

As noted above, various techniques of the present disclosure include receiving and processing messages transmitted from other unmanned aerial vehicles, such as in accordance with the process 500 discussed above in connection with the FIG. 5. FIG. 6 shows an illustrative example of a process 600 for processing a received message in accordance with an embodiment. The process 600 may be performed by any suitable system such as by an on-board computer system on an unmanned aerial vehicle, such as described below. In an embodiment, the process 600 includes receiving 602 a message package that may comprise a message, a digital signature, and a digital certificate. The message package may be received 602 from another unmanned aerial vehicle or from a command control center such as a command control facility, such as described above. The message may be received 602 in accordance with a wireless protocol used to transfer the message.

In an embodiment, to process the received 602 message, the process 600 includes determining 604 whether the digital certificate of the message package is trusted. Determining 604 whether the digital certificate of the message package is trusted may include accessing a copy of a certificate authority certificate, such as described above, and using a public cryptographic key encoded in the certificate authority certificate to verify a digital signature of the digital certificate that was received 602 in the message package. Determining whether the digital certificate is trusted may involve additional operations as well, such as determining whether the digital is expired (and, therefore, untrusted), whether the digital certificate corresponds to an identity that purportedly digitally signed the message, and/or other operations. Note that, in some embodiments, expirations on digital certificates have relatively short expirations (e.g., valid for one day or one week). When an unmanned aerial vehicle returns to a command and control facility or otherwise becomes able to communicate with the command and control facility, the unmanned aerial vehicle may, if within a specified threshold of expiration of its digital certificate, request from a command and control server (or other entity, such as a certificate authority) a digital certificate. The entity able to issue digital certificates may provide one in response, thereby enabling the unmanned aerial vehicle to digitally sign messages. Similarly, if the unmanned aerial vehicle does not return to renew a digital certificate (e.g., because it was captured maliciously or otherwise was unable to return), the digital certificate of the unmanned aerial vehicle will be valid for a relatively short amount of time, thereby limiting any window of opportunity to impersonate the unmanned aerial vehicle should someone gain access to the private cryptographic key.

If it is determined 604 that the digital certificate is not trusted, in an embodiment, the unmanned aerial vehicle performing the process 600 is therefore unable to verify whether the message should be trusted because, although correctness of the digital signature may be verifiable, the trustworthiness of the digital signature cannot be verified. Accordingly, if it is determined 604 that the certificate is not trusted, the process 600 may include rejecting 606 the message. The message may be rejected 606 in various ways in accordance with various embodiments. For example, in some embodiments the unmanned aerial vehicle performing the process 600 simply does not do anything with the received 602 message. That is, any tasks pending or queued of the unmanned aerial vehicle performing the process 600 may remain unaffected. Rejection 606 of the message may be more complicated in various embodiments. In some instances, a notification of a reason for the rejected message, such as invalidity of the digital certificate, may be transmitted to a command and control facility either directly or through one or more other unmanned aerial vehicles.

If the unmanned aerial vehicle performing the process 600 determines 604 that the digital certificate is trusted, the unmanned aerial vehicle may verify whether the digital signature of the message is valid. For example, the unmanned aerial vehicle may utilize a public cryptographic key encoded in the digital certificate to verify the digital signature using the public cryptographic key and the message. If the unmanned aerial vehicle determines 608 that the digital signature is not valid, the message may be rejected 606 such as describe above.

If, however, the unmanned aerial vehicle performing the process 600 determines 608 that the digital signature is valid, the unmanned aerial vehicle may determine 610 whether the message is actionable. In an embodiment, a message is actionable if the message applies to one or more uncompleted tasks or, more generally, one or more uncompleted operations that are queued or otherwise scheduled to be performed. A rules engine may be used to determine whether the message is applicable to a current or pending task. An example message applicable to an uncompleted task is a message containing weather data for a location within a specified threshold distance of any coordinates listed in any uncompleted tasks for the unmanned aerial vehicle. More complicated analyses may also be performed such as by determining whether a path of an unmanned aerial vehicle will cause the unmanned aerial vehicle to come within a threshold distance of a location for which weather data or other data corresponding to potential hazards to the unmanned aerial vehicle was recorded. As yet another example of an actionable message, one or more uncompleted tasks may be reliant on information received from another unmanned aerial vehicle previously. If the message indicates that information from the unmanned aerial vehicle is untrustworthy, the message may be actionable as a result of a need to recalculate tasks reliant on information from the untrusted unmanned aerial vehicle.

In an embodiment, if the unmanned aerial vehicle performing the process 600 determines 610 that a message is actionable, the process 600 may include initiating 612 processing of the message. As noted above and discussed in more detail below, the manner in which the message is processed may vary in accordance with various embodiments. If the unmanned aerial vehicle performing the process 600 determines 610 that the message is not actionable, or upon initiation of processing of the message the unmanned aerial vehicle performing the process 600 may digitally sign 614 the message package to generate an updated message package. The updated message package may comprise the message, a new digital signature, and a certificate of the unmanned aerial vehicle performing the process 600. In other embodiments, the received 602 message package is used as a message that is digitally signed to generate the updated message package that may include the received 602 message package, a digital signature of the received 602 message package, and a digital certificate of the unmanned aerial vehicle performing the process 600. Having generated the updated message package, the unmanned aerial vehicle performing the process 600 may transmit 616 the updated message package such as to another unmanned aerial vehicle or to a command and control facility.

As with all processes described herein, numerous variations are considered as being within the scope of the present disclosure. For example, in FIG. 6, the unmanned aerial vehicle that received 602 the message package generates an updated message package. This may indicate, for instance, that the unmanned aerial vehicle has vetted the message. In other embodiments, however, the unmanned aerial vehicle does not generate an updated message package, but just simply forwards the message package on to another unmanned aerial vehicle and/or command and control facility. As another example of a variation within the scope of the present disclosure, transmission 616 of the message package or updated message package may be performed after monitoring for an ability to communicate with another unmanned aerial vehicle different from the one from which the message was received 602.

Other variations also considered as being within the scope of the present disclosure include variations in the order in which operations are performed. For example, as illustrated in FIG. 6, certain operations depend on a digital certificate of the message package being trusted, the digital signature in the message package being valid, and the message being actionable. Additional operations may be performed to determine whether to trust a digital signature. For instance, a time stamp of the message may be used to determine whether the message is stale, where staleness of a message may be determined by the passage of a threshold amount of time since the message was generated (e.g., because weather data may be useful for a limited amount of time). Further, in some embodiments, messages are generated with a time to live value (often abbreviated as "TTL"). A time to live value may be information that indicates an expiration of the message. A time to live value may, for instance, specify a time when expiration occurs. As another example, the time to live value may specify a time stamp when the message was generated and the amount of time that can elapse before the message expires. As yet another example, the time to live value may be a counter that is incremented each time the message passes from one unmanned aerial vehicle to another where the time to live value includes a limit on the counter indicating when the message expires. Other information may also be used as a time to live value. Generally, any mechanism by which an unmanned aerial vehicle can determine whether the message is stale is considered as being within the scope of the present disclosure.

In addition, operations regarding whether to trust a digital signature and/or other operations (e.g., determining whether an action is actionable) may be performed in a different order. For example, invalidity of the digital signature may mean that it is unnecessary to check whether the certificate is trusted. As a result, termination of trustworthiness of the digital certificate and determination of validity of the digital signature may be performed in a different order and/or in parallel. Generally, operations described herein may be performed in any order not contradicted by context. For example, when a result of one operation is not necessary for performance of another operation, the two operations may be performed in any order or in parallel. In other words, the illustration of certain operations being performed in a particular order does not necessarily mean that embodiments of the present disclosure are limited to that order and that the scope of the present disclosure extends to other orders of operations that are not contradicted explicitly or by context.

Figure 7:
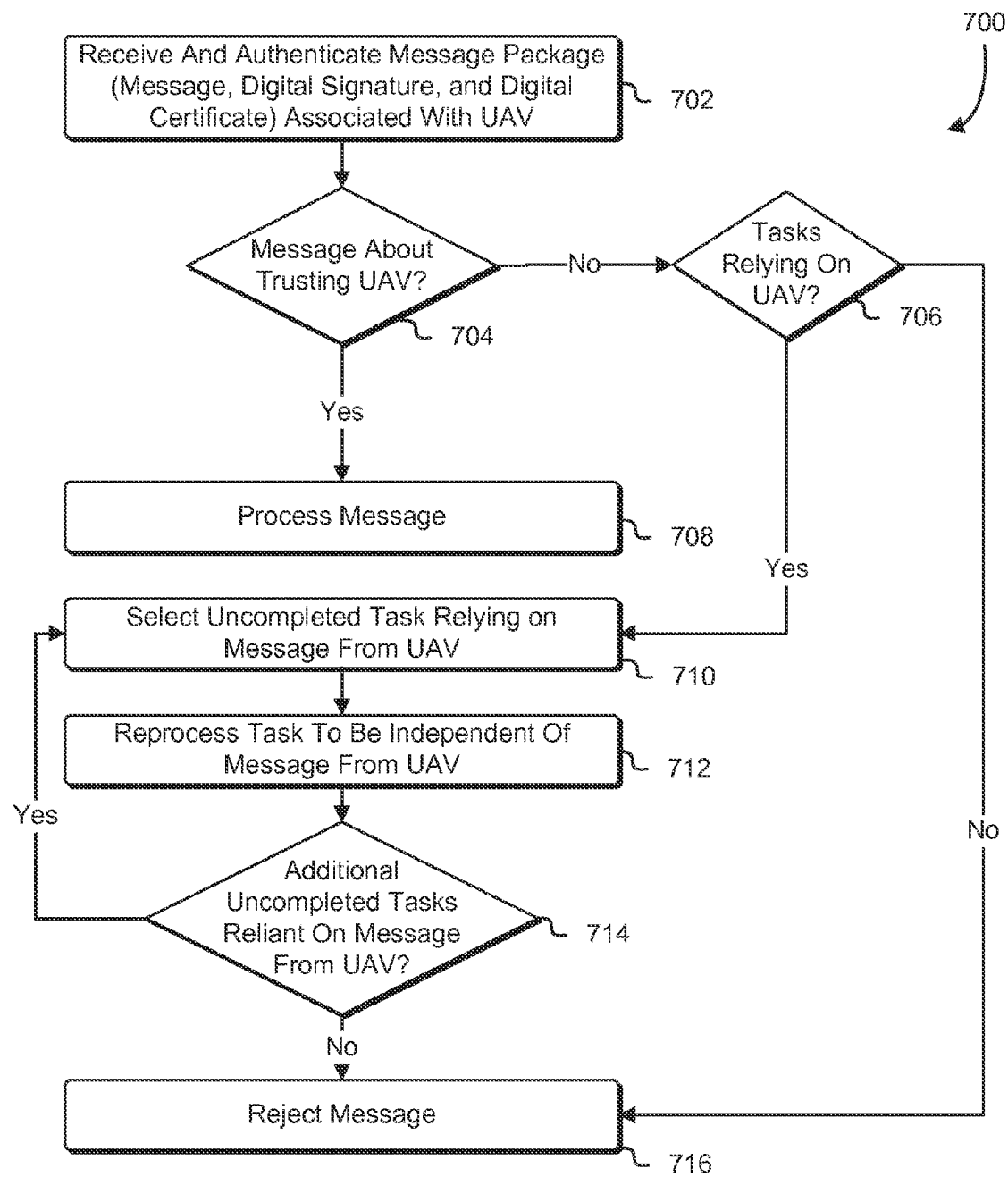
FIG. 7 shows an illustrative example of a process for processing a message that is received where operations may be performed as a result of the message being untrusted in accordance with an embodiment.

As discussed above, tasks of an unmanned aerial vehicle may be reliant upon messages received from other unmanned aerial vehicles in accordance with various embodiments. In some circumstances, an unmanned aerial vehicle may become compromised either through malicious activity or malfunction. FIG. 7 accordingly illustrates an example process 700 for processing messages received from other unmanned aerial vehicles or from a commanding control facility in accordance with an embodiment. The process 700 may be performed by any suitable system such as by an onboard computer system of an unmanned aerial vehicle. In an embodiment, the process 700 includes receiving and authenticating 702 (e.g., determining whether to trust) a message package, such as described above. For example, determining whether to trust the message may include determining whether the digital signature is valid, whether the digital certificate is trusted, whether the digital certificate is otherwise valid (e.g., unexpired) and processing content of the message. Other information, such as a TTL value and/or a time stamp of the message, may also be used to determine whether the message is trusted.

The message package may be associated with an unmanned aerial vehicle, which may be identified in the message or, in some examples, may be the unmanned aerial vehicle from which the message was received 702. For example, the message package may include a message, a digital signature, and a digital certificate. Upon receiving 702 the message package, the process 700 may include determining 704 whether the message is about trust of an unmanned aerial vehicle associated with the message that was received 702 (e.g., an unmanned aerial vehicle specified in the message). For example, the message may indicate revocation of a digital certificate associated with an unmanned aerial vehicle or may specify the unmanned aerial vehicle not to be trusted using an identifier of the unmanned aerial vehicle. Note that, while FIG. 7 shows the process 700 being performed with a single unmanned aerial vehicle that is the subject of a message, the message may be about the trust of multiple unmanned aerial vehicles and the process 700 may be adapted accordingly.

In an embodiment, if the unmanned aerial vehicle performing the process 700 determines 704 that the message is about trusting an unmanned aerial vehicle, the unmanned aerial vehicle performing the process 700 may determine 706 whether the unmanned aerial vehicle has any uncompleted tasks (generally, any uncompleted operations) reliant on the unmanned aerial vehicle from which the message was received 702. If, however, the unmanned aerial vehicle performing the process 700 determines 704 to trust the message, the process 700 may include processing 708 the messages, such as described above. For example, processing 708 the message may include updating one or more uncompleted tasks to avoid, for instance, inclement weather or other hazards.

Determining 706 whether the unmanned aerial vehicle has any uncompleted tasks reliant on the unmanned aerial vehicle that purportedly generated the message may be performed in various ways in accordance with various embodiments. For instance, in some embodiments, the unmanned aerial vehicle may utilize a data structure, such as described above, in connection with FIG. 4 to select any uncompleted tasks that include, in reliance data, an identifier of the unmanned aerial vehicle that purportedly generated the message. Generally, the unmanned aerial vehicle performing the process 800 may store information usable to determine the origin of the message and may use such data to determine whether any tasks relied on the origin of the message, i.e., the unmanned aerial vehicle from which the message was received.

If the unmanned aerial vehicle performing the process 700 determines 706 that one or more uncompleted tasks are reliant on the unmanned aerial vehicle from the message package was received 702, the process 700 may include selecting 710 an uncompleted task relying on the message from the unmanned aerial vehicle from which the message package was received 702. In an embodiment, the uncompleted task is selected in accordance with a place in a queue of tasks and, in particular, the uncompleted task is selected as the highest uncompleted task in the queue that is reliant on the unmanned aerial vehicle from which the message package was received. In this example, being higher in a queue corresponds to earlier fulfillment by the unmanned aerial vehicle performing the process 700. Note that selection of tasks reliant on a message from the unmanned aerial vehicle from which the message package was received 702 may include more complicated determinations of whether to select a particular message. For instance, in some embodiments, messages are categorized into different message types. Selection of a task may occur only for tasks reliant on messages of a certain type (or one of several types), whereas tasks reliant on messages of one or more other types may not be selected. As another example, as discussed below, unmanned aerial vehicles may be configured to vet messages. In such embodiments, selection of a task may be determined based at least in part on a number of other unmanned aerial vehicles that have vetted (e.g., confirmed) the message (e.g., whether a set of unmanned aerial vehicles that have vetted the message satisfies a set of quorum rules that define a quorum of trusted aerial vehicles (which may be required by the quorum rules to be trusted unmanned aerial vehicles)).

Having selected 710 the uncompleted task reliant on a message from the unmanned aerial vehicle from which the message package was received 702, the process 700 may include reprocessing 712 the task to be independent of the message from the unmanned aerial vehicle that the task was reliant upon. Reprocessing the task may include, for example, calculating a new route that, in a manner independent of, avoidance of a location indicated in the message from the unmanned aerial vehicle. For instance, the unmanned aerial vehicle may use its current location (e.g., determined from GPS data of a GPS sensor) to determine an optimal route from the current location, which may or may not differ from the route before it was recalculated. As another example, the unmanned aerial vehicle may store multiple versions of the task (generally, information usable to determine previous versions, such as diffs between versions) and may use the stored versions to roll back to a previous version that was not reliant on the unmanned aerial vehicle from which the message package was received 702. In the example of a task with a route, the unmanned aerial vehicle may roll back to a previous route, which may involve travelling to a location on the route from a current location to continue following the route.

Note that reprocessing may, in some instances, result in no change to the task, such as when the message did not result in a change to a previous version of the task or when information from another unmanned aerial vehicle (or, in some examples, a set of unmanned aerial vehicles forming a quorum) results in recalculation of the task resulting in the task being unchanged. Further, reprocessing a task may include reprocessing a set of tasks, which may include, for instance, reordering some tasks. As an illustrative example, an unmanned aerial vehicle may have two delivery tasks. At the time of determining to update a task, the unmanned aerial vehicle may determine that, because of its current location, it would be faster to perform the delivery tasks in a different order. To do this, the unmanned aerial vehicle may determine to which route of multiple routes for multiple tasks the unmanned aerial vehicle is closest (which may be approximated by calculating distances to the coordinates that define the routes and selecting the shortest distance) and begin with the corresponding task. As a result, starting and ending locations for tasks may change and other tasks may have to be recalculated (e.g., new routes determined). Generally, when recalculating a task, the unmanned aerial vehicle may utilize its current state as input into algorithms (e.g., route calculation algorithms) used to recalculate the task. Reprocessing/recalculating a task may also include adding new tasks to a set of tasks. For instance, reprocessing of a task may cause a task to deliver a payload to be replaced with a task to return to a command and control center. As another example, reprocessing a task may involve adding a task without replacing another task. For instance, if a relied-upon message from an untrustworthy unmanned aerial vehicle indicates information about a location (e.g., weather), a task to verify the information may be added and one or more tasks may be scheduled such that their performance is dependent on whether data in the message was successfully verified.

Having reprocessed 712, or alternatively, initiated reprocessing of the task that was previously reliant from the message from the unmanned aerial vehicle from which the message package was received 702, the process 700 may include determining whether there are any additional uncompleted tasks reliant on any message from the unmanned aerial vehicle for which the message package was received 702. If determined 714 that there are additional uncompleted tasks, the process 700 may include selecting another uncompleted task reliant on a message from the unmanned aerial vehicle from which the message package was received 702, and reprocessing the task (or rolling back to a previous version of the task). Such selection and reprocessing of tasks reliant on a message from the unmanned aerial vehicle from which the message package was received may continue until the unmanned aerial vehicle performing the process 700 determines 714 that there are no additional uncompleted messages reliant on any message from the unmanned aerial vehicle from which the message package was received 702.

When determined that there are no additional uncompleted tasks reliant on a message from the unmanned aerial vehicle from which the message package was received, the unmanned aerial vehicle performing the process 700 may reject 716 the message in the message package that was received 702, such as described above. For instance, the unmanned aerial vehicle performing the process 700 may avoid processing the message in the message package that was received 702 in accordance with the message in the message package being trustworthy. As another example, the unmanned aerial vehicle performing the process 700 may generate a message that includes a notification of the untrusted message from the unmanned aerial vehicle from which the message package was received 702. Additional operations may be performed when a message is rejected or even when messages are not rejected. For example, messages received from a command and control facility and/or another unmanned aerial vehicle may be logged and that may be added to a log of messages that the unmanned aerial vehicle has received.

Figure 8:
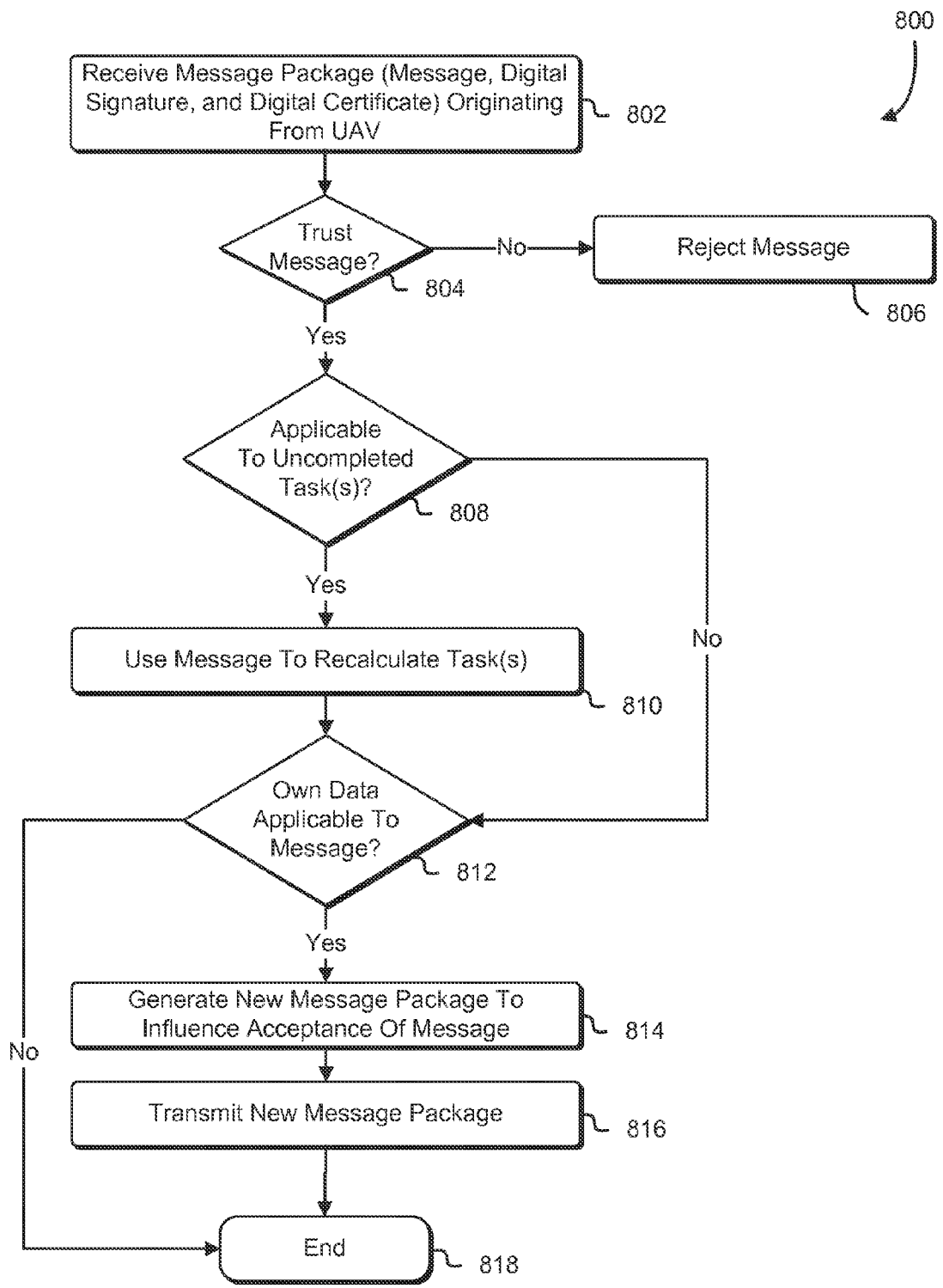
FIG. 8 shows an illustrative example of a process for influencing acceptance of a message in a fleet of unmanned aerial vehicles in accordance with an embodiment.

In some embodiments, when an unmanned aerial vehicle encounters a message that is determined to be trustworthy, the unmanned aerial vehicle may perform additional operations that influence acceptance of the message by other unmanned aerial vehicles. FIG. 8 accordingly shows an illustrative example of a process 800 for processing a message received from another unmanned aerial vehicle. The process 800 may be performed by any suitable system, such as, by an on-board computer system of an unmanned aerial vehicle, such as described below. In an embodiment, the process 800 includes receiving 802 a message package that originates from an unmanned aerial vehicle. It should be noted that a message package originating from an unmanned aerial vehicle might be received from a different unmanned aerial vehicle than the unmanned aerial vehicle that generated the message. For example, an unmanned aerial vehicle performing the process 800 may receive 802 the message package from an unmanned aerial vehicle that is relaying the message package from another unmanned aerial vehicle that originated the message package.

Having received 802 the message package, the unmanned aerial vehicle performing the process 800 may determine 804 whether to trust the message. A determination 804 whether to trust the message may be performed in any suitable manner, such as described above. If the unmanned aerial vehicle performing the process 800 determines 804 not to trust the message, the process 800 may include rejecting 806 the message, such as described above. If, however, it is determined 804 to trust the message the process 800 may include determining 808 whether the message in the message package is applicable to any uncompleted tasks. For example, an identifier of the originating unmanned aerial vehicle may be used to determine whether any reliance data, such as data in the data structure 400, discussed above in connection with FIG. 4, indicates reliance on a message from the unmanned aerial vehicle from which the message package was received.

If determined 808 that the message of the message package that was received 802 is applicable to any uncompleted tasks, the process 800 may include using 810 the message to recalculate (or initiate recalculation of) any uncompleted tasks to which the message applies. Upon recalculating or initiating recalculation of the task(s), or upon determining 808 that there are no uncompleted tasks to which the message applies, the process 800 may also include determining 812 whether the unmanned aerial vehicle performing the processes 800's own data is applicable to the message that was received 802. As an example, if the message contains weather data for a location, the unmanned aerial vehicle performing the process 800 may determine whether the unmanned aerial vehicle itself has collected weather data for the same location or a location within a specified threshold distance of the location for which weather data was received 802. Data indicative of a non-meteorological hazard at a location may be identified as applicable in a similar manner. As yet another example, if the message indicates that a specified unmanned aerial vehicle (e.g., one different from the one performing the process 800 and from the one from which the message package was received) is untrustworthy (e.g., because a digital certificate was revoked), the unmanned aerial vehicle that received 802 the message package may determine if it has likewise detected untrustworthiness of the specified unmanned aerial vehicle. Generally, the unmanned aerial vehicle performing the process 800 applies programming logic to determine whether data it has collected is in conformance with, or disagreement with data in a message that was received. A rules engine or other mechanism (e.g., decision tree) may be used to determine whether collected data is applicable to the message.

If the unmanned aerial vehicle performing the process 800 determines 812 that its own data is applicable to the message that was received 802 in the message package, the process 800 may include generating 814 a new message package to influence acceptance of the message in the message package that was received 802. As an example, signature chaining may be utilized to add a digital signature to the message. As yet another example, an identifier of the message may be digitally signed. Having generated 814 the new message package, to influence acceptance of the message, the unmanned aerial vehicle may transmit 816 the new message package to another unmanned aerial vehicle or to a command control facility. If, however, it is determined 812 that the unmanned aerial vehicle's own data is not applicable to the message, the process 800 may end 818.

Figure 9:
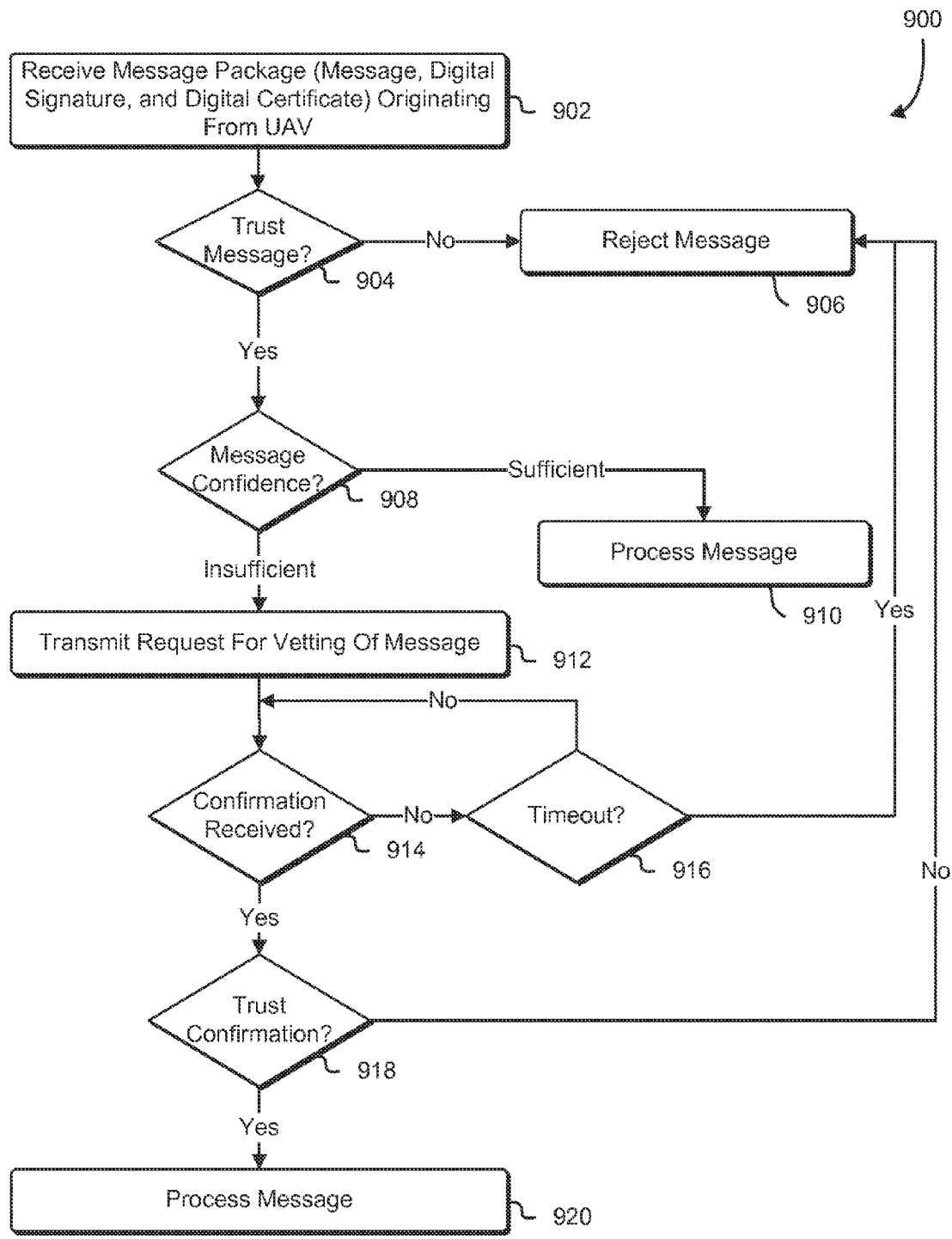
FIG. 9 shows an illustrative example of a process for processing a message that is received utilizing a confidence of the message in accordance with an embodiment.

In some embodiments, unmanned aerial vehicles are configured to determine a confidence of a message to determine how to process the message. For example, when an unmanned aerial vehicle receives a message and has data that agrees with the message, the unmanned aerial vehicle may retransmit the message and/or transmit a new message with an indication of confidence in the data thereby enabling other unmanned aerial vehicles to rely on the message based at least in part on its confidence. FIG. 9 shows an illustrative example of a process 900 for processing messages and embodiments where messages are analyzed for confidence. The process 900 may be performed by any suitable system such as by an on-board computer system of an unmanned aerial vehicle. In an embodiment, the unmanned aerial vehicle may receive 902 a message package comprising a message, a digital signature, and a digital certificate that originates from another unmanned aerial vehicle. The unmanned aerial vehicle that receives 902 the message package may determine 904 whether to trust the message, such as described above. For example, the unmanned aerial vehicle that receives 902 the message package may verify validity of the digital certificate using its own copy of a certificate authority digital certificate, may verify validity of the digital signature, and if both the digital certificate and digital signature received in the message package are valid, may determine 904 to trust the message. Other information, such as information indicating if the message has exceeded a TTL or is otherwise stale, may be used. Similarly, if one or both of the digital certificate and digital signature received 902 in the message package is invalid, and/or if the message is stale, the unmanned aerial vehicle that received 902 the message package may determine 904 to not trust the message.

In an embodiment, when the unmanned aerial vehicle that receives 902 the message package determines 904 to not trust the message, the unmanned aerial vehicle may reject 906 the message, such as described above. If, however, the unmanned aerial vehicle that receives 902 the message package determines 904 to trust the message, the process 900 may include determining 908 a level of confidence in the message and in this example, whether the confidence of the message is sufficient or insufficient. The unmanned aerial vehicle performing the process 900 may determine 908 the level of confidence in a message in various ways in accordance with various embodiments. For example, message confidence may be determined by a number of digital signatures from distinct unmanned aerial vehicles (that may be required to be trusted) that have expressed confidence in the message. For instance, when an unmanned aerial vehicle receives a message it may participate in a digital signature chain whereby the unmanned aerial vehicle digitally signs information comprising the message and any digital signatures that were received with the message where the digital signatures were included to express confidence in the message. As another example, an unmanned aerial vehicle may express confidence in a message by digitally signing an identifier of the message, and determining 908 a confidence level of the message may include counting a number of digital signatures of the identifier of the message. The identifier may be cryptographically bound to the message. For instance, the identifier may be a hash of the message or generated based at least in part on a hash of the message. In such embodiments, cryptographic verification of the binding of the identifier to the message may also be performed.

In various embodiments regardless of how confidence is expressed in the message using digital signatures, each digital signature used to express confidence in the message may be verified by the unmanned aerial vehicle performing the process 900. In some embodiments message confidence is determined by comparing a number of valid digital signatures expressing confidence in the message to a threshold value where each digital signature expressing confidence in the message may be from a distinct unmanned aerial vehicle, although embodiments of the present disclosure extend to those where a single unmanned aerial vehicle may express confidence in a message more than once thereby increasing confidence in the message such as when an unmanned aerial vehicle receives and verifies a message more than once. Sufficiency of the message confidence may, generally, be determined in accordance with a set of quorum rules that define a quorum of unmanned aerial vehicles required to have vetted the message. The quorum rules may be simple (e.g., at least N unmanned aerial vehicles, N a positive integer) or may be more complex, even comprising multiple individual rules logically connected with one Boolean operators (e.g., AND, OR, NOT, etc.). For instance, a set of digital signatures may be used to satisfy the quorum rules if N unmanned aerial vehicles of a first generation have vetted the message or M unmanned aerial vehicles of a second generation have vetted the message (with M and N being different positive integers). Satisfaction of a set of quorum rules may also depend on a type of message that was received 902. For example, messages with weather data may have a more lax set of quorum rules compared with messages with a command to perform an irreversible operation (e.g., shutting down motors while in flight, dropping a payload, or other operations). Satisfaction of quorum rules may also depend on an amount of time that was passed since the message was generated and/or last vetted, where, for instance, a longer passage of time may require additional vetting of the message. Other variations are also considered as being within the scope of the present disclosure.

If the unmanned aerial vehicle that received 902 the message package determines 908 that there is sufficient confidence in the message, the process 900 may include processing 910 the message, such as described above. For instance, the unmanned aerial vehicle may analyze any uncompleted tasks to determine whether to change any uncompleted tasks, may add one or more new tasks if so indicated by the message and/or may perform one or more operations that result in retransmission of the message to another unmanned aerial vehicle or a command and control facility. If the unmanned aerial vehicle performing the process 900 determines 908 that there is insufficient confidence in the message, as illustrated in an example embodiment in FIG. 9, the unmanned aerial vehicle may perform one or more operations to obtain confirmation of vetting of the message. In an embodiment, if determined 908 that there is insufficient confidence in the message, the process 900 may include transmitting 912 a request for confirmation of vetting of the message.

The request for confirmation of vetting of the message (request for confirmation) may be transmitted to different entities in different embodiments. In some examples, the request for confirmation is transmitted to another unmanned aerial vehicle. The unmanned aerial vehicle that receives the transmitted request for confirmation, which may include the message and associated data, such as associated digital signatures and/or certificates, may independently vet the message by making a determination on whether to trust the message and a determination of validity of data contained in the message. As another example, the request for confirmation may be transmitted to a command and control facility. Note that the request for confirmation may be transmitted directly to the command/control facility such as when the unmanned aerial vehicle that received 902 the message package is within a communication range of the command and control facility, or the request for confirmation may be transmitted 912 indirectly to the command and control facility, such as by transmitting the request for confirmation to another unmanned aerial vehicle, which may be configured to then relay the request for confirmation to the command and control facility if in communication range of the command and control facility, or to yet another unmanned aerial vehicle such that a fleet of unmanned aerial vehicles may eventually relay the request for confirmation to the command and control facility.

At the command and control facility, a command and control server may process the request for confirmation by vetting the message, such as by verifying data in the message. As an example, the server may determine whether a command in the message was indeed transmitted from command and control facility and may transmit confirmation of vetting of the message to the unmanned aerial vehicle that received 902 the message. As with the request for confirmation, the transmission of the message confirmation may be transmitted directly (i.e., without the message confirmation passing through any intermediary devices) to the unmanned aerial vehicle that received 902 the message package and requested 912 confirmation of vetting of the message such as if the unmanned aerial vehicle is within communication range, or the confirmation may be routed through a fleet of unmanned aerial vehicles such that the fleet of unmanned aerial vehicles will eventually relay the confirmation to the unmanned aerial vehicle that received 902 the message package. It should be noted that the confirmation generated by the command and control server may include a digital signature generated by the command and control center server and may include a digital certificate that is digitally signed by a certificate authority to enable the unmanned aerial vehicle that received 902 the confirmation to verify whether to trust the confirmation, such as generally how unmanned aerial vehicles are configured to determine trust of messages, such as described above.

If the confirmation passes through multiple unmanned aerial vehicles en-route to the unmanned aerial vehicle that received 902 the message package, in some embodiments, intermediate unmanned aerial vehicles that relayed the confirmation may independently vet the confirmation by making independent determinations of whether to trust the confirmation, and if the confirmation is detected as untrustworthy, such as if a digital signature or digital certificate associated with the confirmation is invalid, the unmanned aerial vehicle may refuse to retransmit the confirmation.

Once the unmanned aerial vehicle transmits 912 the request for confirmation of vetting of the message, the unmanned aerial vehicle that transmitted 912 the request for confirmation of the message may monitor for receipt of the confirmation. As illustrated in FIG. 9, the unmanned aerial vehicle may repeatedly determine whether 914 confirmation is received; if not, determine 916 whether a timeout has occurred (that is, whether a threshold amount of time has passed); and if not, determine again 914 whether confirmation is received and whether a timeout has occurred. If during this process the unmanned aerial vehicle determines 916 that the timeout has occurred, the process 900 may include rejecting 906 the message, such described above. In alternate embodiments, the message and associated information (e.g., digital signatures for the message) may be cached and, should the unmanned aerial vehicle caching the message later receive additional signatures for the message (e.g., by a response to the request received after the timeout or from another unmanned aerial vehicle not in response to the request for confirmation), the cached copy can be combined with later-received information to determine whether there is sufficient confidence in the message.

Returning to the illustrated embodiment, if, however, before a timeout occurs, the unmanned aerial vehicle determines 914 the confirmation is received the unmanned aerial vehicle may determine 918 whether to trust the confirmation such as in the manner in which an unmanned aerial vehicle may determine whether to trust messages in general, such as described above. Determining whether to trust the confirmation (or, generally, a message) may also include additional operations. For instance, digital signature chaining may be used to establish a chain of custody for the message. If any digital signatures in the chain are unverified, additional scrutiny may be given to the message, votes from unmanned aerial vehicles corresponding to the unverified digital signatures may be discounted in determining a confidence of the message, and/or the message may simply be rejected as untrusted. Generally, a set of rules may be applied to the path (e.g., ordered set of unmanned aerial vehicles) the message took on the way to being received, digital signatures may be used to verify the path or a portion thereof, and the rules may define whether the message is trusted. If the unmanned aerial vehicle determines 918 to not trust the confirmation, the process 900 may include rejecting 906 the message, such as described above. Note that while various figures illustrate multiple paths leading to rejection 906 of a message, the manner in which the message is rejected may vary in accordance with a particular path that flows to rejection of the message. If determined 918 to trust the confirmation, the process 900 may include processing 920 the message, such as described above.

As with all processes discussed herein, variations of the process 900 are considered as being within the scope of the present disclosure. In an embodiment, for instance, a request for confirmation may be generated and transmitted as a result of an unmanned aerial vehicle's inability to successfully verify that it should trust a message. For instance, suspected compromise of an unmanned aerial vehicle may cause a revocation of the unmanned aerial vehicle's digital certificate, rendering unverifiable digital signatures that would otherwise be successfully verified using the digital certificate. For instance, despite the reason for the revocation, the unmanned aerial vehicle may nevertheless gather and provide accurate data about the weather and/or potential threats to unmanned aerial vehicles in various locations. Instead of rejecting such messages, an unmanned aerial vehicle that receives a message that the unmanned aerial vehicle is unable to successfully verify can generate and transmit a request for confirmation to one or more other unmanned aerial vehicles and/or a command and control server (e.g., if in communication range). In such embodiments, received confirmations sufficient to satisfy a set of quorum rules (which may be a single confirmation, in some implementations and/or for some message types) may be used to gain confidence in the otherwise unverifiable message. In another example, an inability to determine to trust a confirmation that was received result in another attempt to gain confirmation and such attempts may be repeated until a timeout or other limit (e.g., number of attempts) occurs.

Figure 10:
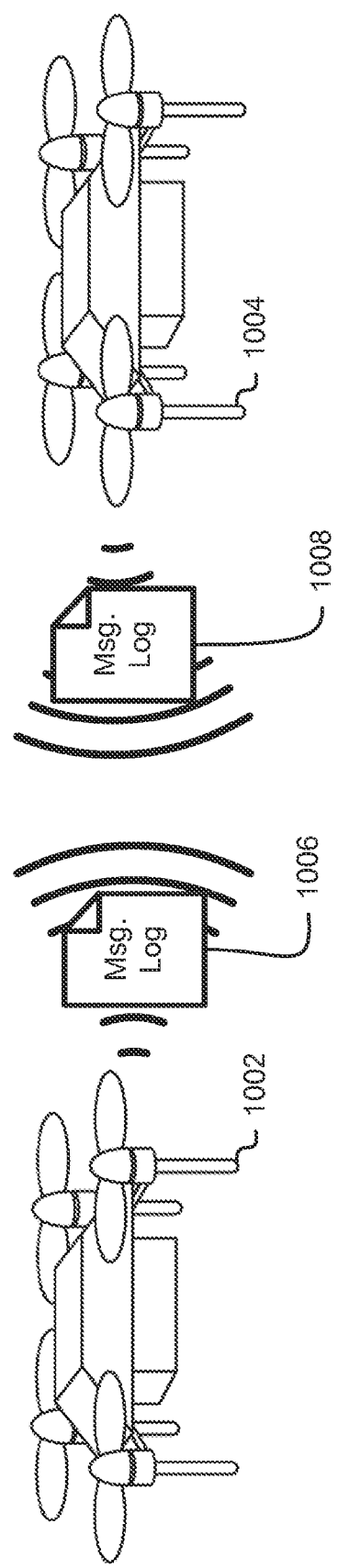
FIG. 10 shows a diagram illustrating transfer of message logs between unmanned aerial vehicles in accordance with an embodiment.

FIG. 10 shows a diagram 1000 illustrating various aspects of the present disclosure. In this particular example, the diagram 1000 shows the first unmanned aerial vehicle 1002 and a second unmanned aerial vehicle 1004. As noted above unmanned aerial vehicles may detect abilities to communicate with one another during their operation. For instance, when flying to complete a task unmanned aerial vehicles may transmit beacon messages that serve as identifiers of the unmanned aerial vehicles transmitting the beacon messages. An unmanned aerial vehicle that receives a beacon message with a signal strength greater than a threshold and/or an ability to determine what information was transmitted may as a result detect an ability with the unmanned aerial vehicle that transmitted the beacon message. Detecting an ability to communicate with another unmanned aerial vehicle may also include other operations, such as authentication of the other unmanned aerial vehicle and/or performance of a handshake process to establish a communications session (e.g., a cryptographically protected communications session) with the other unmanned aerial vehicle. In other words, detecting the ability to communicate with another unmanned aerial vehicle may include not only detecting the physical ability to communicate, but other abilities, such as communication being authorized and/or authenticated.

In various embodiments, as illustrated FIG. 10, when unmanned aerial vehicles detect an ability to communicate with one another, the unmanned aerial vehicles may exchange a log of messages that each has received. For instance, each of the pair of unmanned aerial vehicles may transmit a request for the others' message log and the unmanned aerial vehicles in the pair may respond accordingly. In some examples, transmission of a message log (or, generally, a message) to another unmanned aerial vehicle may be contingent on authenticating the other unmanned aerial vehicle, such as by transmitting a timestamp or nonce (or other replay-avoiding value) to the other unmanned aerial vehicle, receiving a digital signature and digital certificate from the other unmanned aerial vehicle, and using the timestamp or nonce or other value and a digital certificate to validate the digital signature. As another example, the two unmanned aerial vehicles may mutually authenticate one another in a handshake process to establish a cryptographically protected communications session (e.g., an encrypted communications session) and, the handshake process may fail unless both unmanned aerial vehicles do not successfully authenticate to one another.

As illustrated in FIG. 10, the first unmanned aerial vehicle 1002 may transmit a message log 1006 of messages that it has received from other unmanned aerial vehicles. The message may comprise a table or other data structure that includes each message and associated data, such as a time sample when the message was received, any digital signatures generated based at least in part on the message, and/or any information indicating confidence in the message. The message log 1006 of the first unmanned aerial vehicle may be received by the second unmanned aerial vehicle 1004. As a result of a request for a message log or simply as part of a protocol utilized by the unmanned aerial vehicles, the second unmanned aerial vehicle may transmit its own message log 1008 to the first unmanned aerial vehicle 1002. As discussed in more detail below each unmanned aerial vehicle that received a message log from another unmanned aerial vehicle may process messages in the message log to determine whether to update any uncompleted tasks, add any additional tasks, or perform other operations indicated by the messages.

Figure 11:
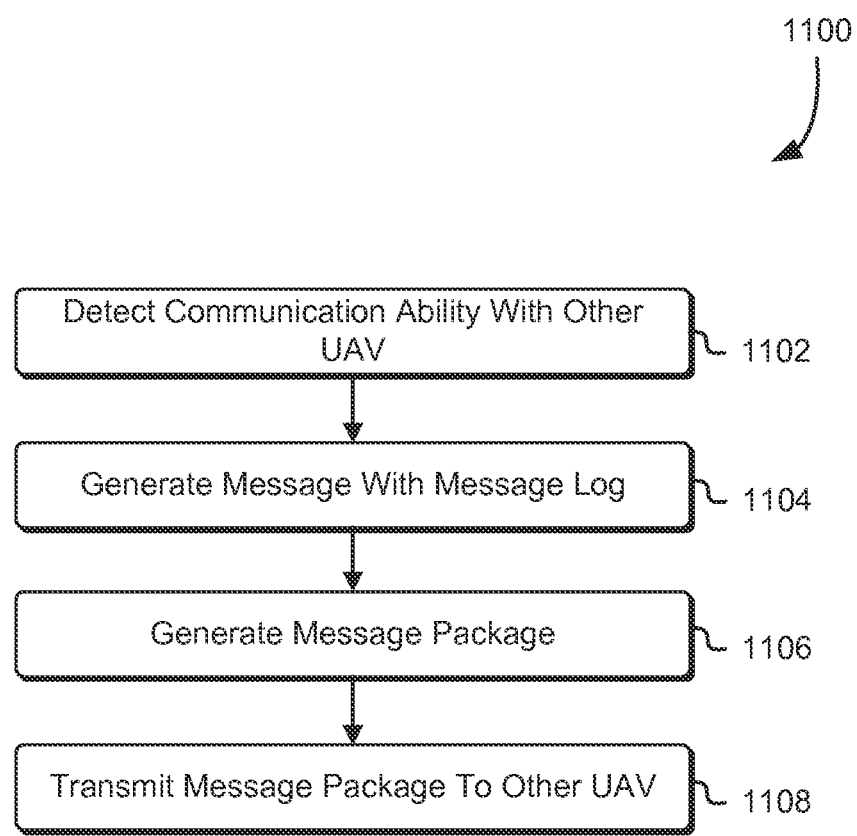
FIG. 11 shows an illustrative example of a process for providing a message log to an unmanned aerial vehicle in accordance with an embodiment.

FIG. 11 shows an illustrative example of a process 1100 that might be performed by an unmanned aerial vehicle such as one of the unmanned aerial vehicles described above in connection with FIG. 10. In an embodiment, the process 1100 includes detecting 1102 an ability to communicate with another unmanned aerial vehicle. Note that while FIG. 11 shows detection 1102 of an ability to communicate with another unmanned aerial vehicle, the process 1100 may be adapted for detection of communication with other components of a distributed system that includes a fleet of unmanned aerial vehicles such as by detecting an ability to communicate with a command and control server of a command and control facility, such as described above, or a terrestrial station used for the purpose of transmitting messages to and from a command and control facility and/or one or more unmanned aerial vehicles.

As a result of detecting 1102 an ability to communicate with another unmanned aerial vehicle as illustrated in FIG. 11, the process 1100 may include generating 1104 a message that contains a message log. In some embodiments, messages from the message log within a specified amount of time are accessed from a local message log and used to generate 1104 the message. In other embodiments, a complete message log is included in the message that is generated 1104. Additional processing may also occur, for example, as a result of detecting 1102 an ability to communicate with another unmanned aerial vehicle, the unmanned aerial vehicle performing the process 1100 may obtain an identifier of the other unmanned aerial vehicle. To avoid transmission of unnecessary information, messages received from the other unmanned aerial vehicle may be identified using the identifier and removed from a set of messages that are included in the message log that is included in the message that is generated 1104. As noted above, the message log may include messages themselves and other associated information such as digital signatures such as for each message any digital signatures generated based at least in part on the message, any digital signatures generated based at least in part on an identifier of the message, and/or any other information that may be stored in association with each message.

Once the message has been generated 1104, the process 1100 may include generating 1106 a message package. To generate 1106 the message package as discussed above, the unmanned aerial vehicle performing the process 1100 may use a private cryptographic key to digitally sign the generated 1104 message thereby resulting in a digital signature. A certificate with a public cryptographic key corresponding to the private cryptographic key may be included in the information that is used to generate the message package. Once the message package has been generated 1106, the process 1100 may include transmitting 1108 the message package to the unmanned aerial vehicle. As with all processes described herein, additional operations may be performed in connection with the process 1100. For example, depending on the particular protocol used for communication between unmanned aerial vehicles, a handshake or other process may be performed.

Figure 12:
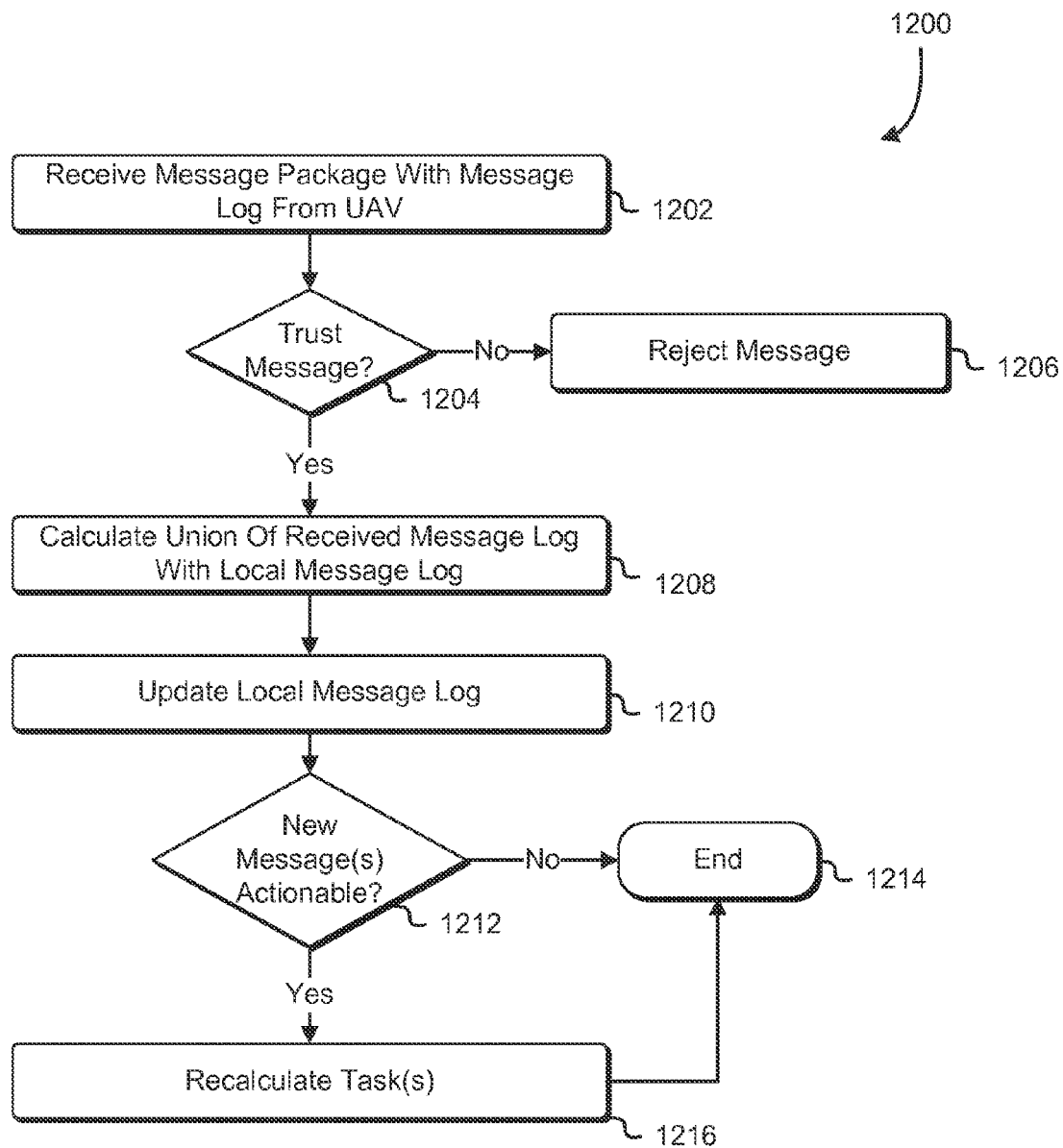
FIG. 12 shows an illustrative example of a process for processing a message log that is received in accordance with an embodiment.

FIG. 12 shows an illustrative example of a process 1200 that may be performed by an unmanned aerial vehicle to process a message log that is received, such as described above, in connection with FIG. 11. In an embodiment, the process 1200 includes receiving 1202 a message package with a message log from an unmanned aerial vehicle. In this particular example, the message package includes a message that is or otherwise comprises the message log. The process 1200 may include determining 1204 whether to trust the message, such as described above. For example, validity of a digital certificate included in the message package may be verified along with validity of a digital signature of the message and/or other information used to determine whether to trust the message such as information indicating whether the message is stale, that is, whether the message was generated more than a threshold amount of time in the past. Note that variations of the present disclosure include those where a determination of whether the message is trusted is not made, but trustworthiness of individual messages in the message log is used instead. If the unmanned aerial vehicle that receives 1202 the message package determines 1204 to not trust the message, the process 1200 may include rejecting 1206 the message.

In an embodiment, if the unmanned aerial vehicle performing the process 1200 determines 1204 to trust the message received 1202, the unmanned aerial vehicle may calculate 1208 a union of the received message log with its own local message log. In an embodiment, the union of the received message log with its own local message log is calculated such that identical messages present in both the received 1202 message log and the local message log only appear once. However, embodiments of the present disclosure apply to less efficient techniques such as when duplication of messages in a message log is allowed.

Having calculated 1208 the union of the received message log with the local message log, the process 1200 may include updating 1210 the local message log to include the calculated union. Updating the local message log may include storing indicators of which messages in the updated 1210 message log are new whether such indicators are included in the message log itself or separately from the message log. Having updated 1210 the local message log, the process 1200 may include determining 1212 whether any new messages are actionable. Determining whether a message is actionable may be performed, such as described above. If determined 121 that there are no new actionable messages, the process 1200 may end 1214 until a new message with another message log is received.

If the unmanned aerial vehicle that received 1202 the message package determines 1212 that there are one or more actionable messages, the process 1200 may include recalculating 1216 tasks to which the one or more actionable messages are applicable. Tasks may be recalculated, such as described above. The process may end 1214 when tasks have been recalculated 1216 or in alternate embodiments such as when recalculation of tasks has been initiated. Additional operations may be performed, such as determining whether individual messages in the message log are trusted (e.g., as discussed above) and reprocessing tasks in accordance with whether individual messages are trusted, such as by only processing tasks to which trusted messages apply.

Figure 13:
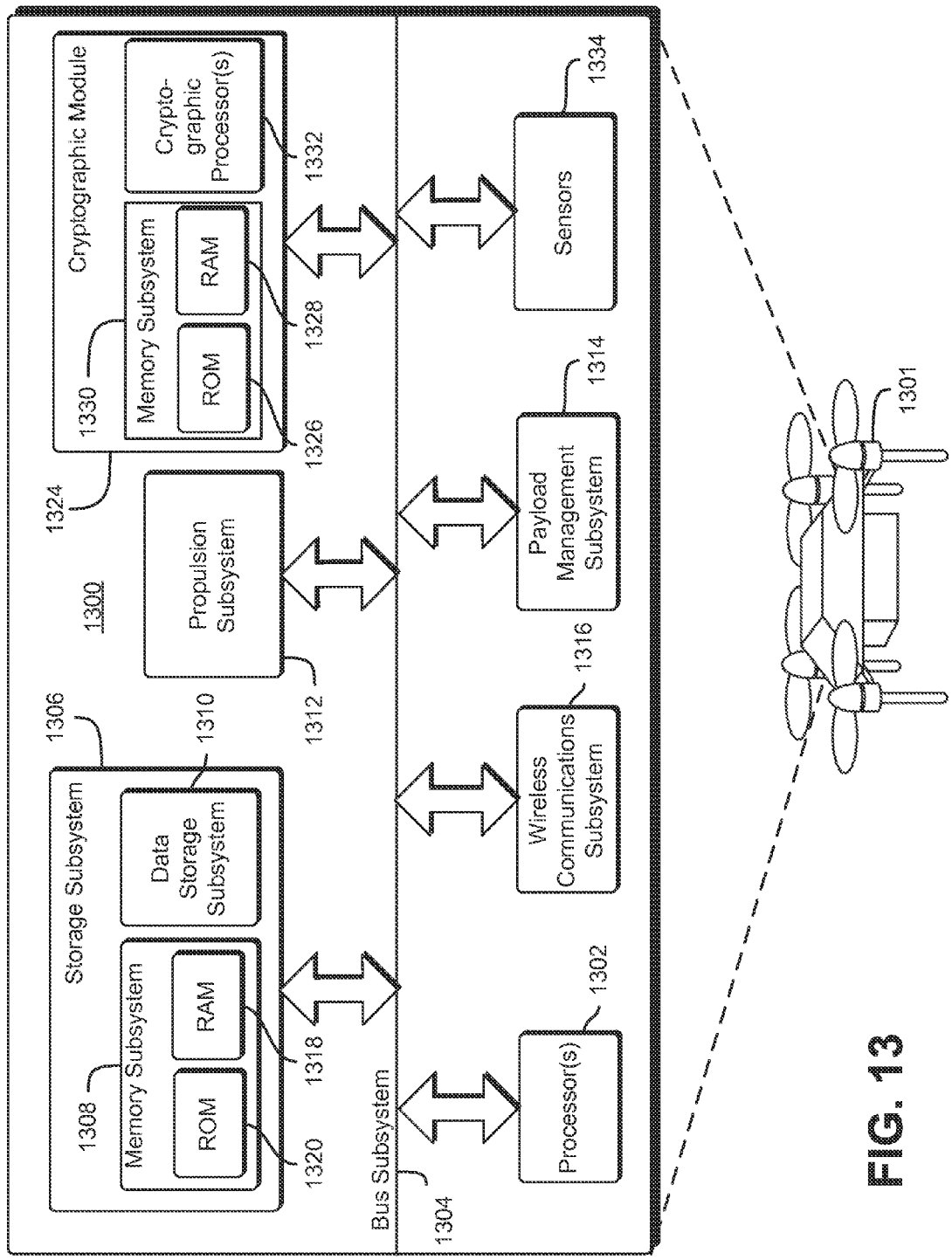
FIG. 13 shows an illustrative example of an unmanned aerial vehicle in accordance with an embodiment.

FIG. 13 is an illustrative, simplified block diagram of an example on-board computer system 1300 of an unmanned aerial vehicle 1301 that may be used to practice at least one embodiment of the present disclosure. In various embodiments, the computer system 1300 may be used to implement any of the systems illustrated herein and described above. As shown in FIG. 13, the on-board computer system 1300 may include one or more processors 1302 that may be configured to communicate with and are operatively coupled to a number of peripheral subsystems via a bus subsystem 1304. These peripheral subsystems may include a storage subsystem 1306, comprising a memory subsystem 1308 and a data storage subsystem 1310, a propulsion subsystem 1312, a payload management subsystem 1314, a wireless communication subsystem 1316, a cryptographic module 1324, comprising a memory subsystem 1330 and one or more cryptographic processors 1332, and a set of sensors 1334.

The bus subsystem 1304 may provide a mechanism for enabling the various components and subsystems of computer system 1300 to communicate with each other as intended. Although the bus subsystem 1304 is shown schematically as a single bus, alternative embodiments of the bus subsystem may utilize multiple busses.

The wireless communications subsystem 1316 may provide an interface to other computer systems and networks. The wireless communications subsystem 1316 may serve as an interface for receiving data from and transmitting data to other systems from the computer system 1300. For example, the network interface subsystem 1316 may enable transtask of messages and other related information (e.g., digital signatures), such as messages indicating weather, hazards, commands, and/or other messages described herein. In an embodiment, the wireless communications subsystem 1316 uses the long-term evolution (LTE) standard to communicate with other wireless communications subsystems of other unmanned aerial vehicles, although the scope of the present disclosure includes wireless communications using any suitable standard and/or protocol. In some examples, the wireless communications subsystem 1316 communicates using the carrier sense multiple access with collision avoidance (CSMA/CA) protocol or another suitable protocol. The wireless communications subsystem 1316 may also facilitate the receipt and/or transtask of data on multiple networks, such as by transmitting some data directly to other unmanned aerial vehicles and transmitting other data through a cellular network.

The propulsion subsystem 1312 may include various components that propel the unmanned aerial vehicle 301 and that control the propulsion of the unmanned aerial vehicle. For example, the propulsion subsystem 1312 may include a plurality of motors, each with a propeller, and a controller for the motors that controls the individual rotational velocity of each propeller so as to control the unmanned aerial vehicle's speed, altitude, direction, pitch, roll, yaw, and, the flight dynamics of the unmanned aerial vehicle. The propulsion subsystem 1312 may control other components (e.g., rudders, flaps, and other components that may affect the aerodynamics of the unmanned aerial vehicle) if the unmanned aerial vehicle is so equipped. While FIG. 13 shows a helicopter-style unmanned aerial vehicle, other unmanned aerial vehicles, such as noted above and, generally, any unmanned vehicle configured to travel on land, on sea, in sea, through air, and/or in space is considered as within the scope of the present disclosure and the specific mechanisms used for propulsion may vary in accordance with different embodiments.

The payload management subsystem 1314 may be a set of components of the computer system 1300 configured for the management of a payload of the unmanned aerial vehicle 1301. For example, the payload management subsystem 1314 may control a cargo bay that opens and closes to drop a payload delivered by the unmanned aerial vehicle 301. In some examples, an unmanned aerial vehicle has multiple cargo bays that can be used to selectively deliver one of many payloads. Generally, the payload management subsystem 1314 may control one or more electrical and/or mechanical systems that enable the unmanned aerial vehicle to release a payload from the control of the unmanned aerial vehicle. The payload management subsystem 1314 may also include various mechanisms (e.g., hooks, magnets, claws, and the like) for retrieving payloads and loading into a cargo bay of the unmanned aerial vehicle or otherwise for bringing a payload into the control of the unmanned aerial vehicle. As such, the payload management subsystem 1314 may include a controller for one or more mechanisms (e.g., actuators or latches) that are used to open and close any cargo bays of the unmanned aerial vehicle or otherwise control one or more payloads. Generally, the payload management system may perform other functions dependent on the specific configuration of the unmanned aerial vehicle 301. For example, the payload management subsystem may be configured to deliver payloads in other ways in addition to or instead of opening cargo bays (e.g., by lowering a payload by a cable). The payload management subsystem 114 may perform more advanced functions, such as shifting payloads to improve flight characteristics, picking up payloads, and, generally, performing other functions that the unmanned aerial vehicle may be configured to perform.

The storage subsystem 1306 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 1306. These application modules or instructions may be executed by the one or more processors 1302. The storage subsystem 1306 may additionally provide a repository for storing data used in accordance with the present disclosure. The storage subsystem 1306 may comprise a memory subsystem 1308 and a data (e.g., file/disk) storage subsystem 1310 (e.g., for storing messages received, logs, and/or other information).

The cryptographic module 1324, which may be a trusted platform module (TPM), includes a memory subsystem 1330, including a main random access memory (RAM) 1328 for storage of instructions and data during program execution and a read-only memory (ROM) 1326, in which fixed cryptographic information may be stored, such as a cryptographic key stored securely within the on-board computer system 1300 so as to be non-exportable (i.e., inaccessible through any call to the cryptographic module 1324). The cryptographic module 1324, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 11889, which are incorporated herein by reference. The on-board computer system 1300 may also store cryptographic keys in RAM 1328 and/or processor registers for temporary cryptographic processing. The cryptographic information stored in memory may be used in combination with cryptographic information obtained via the network interface 1316 and/or one or more of the user interface input devices 1312. The one or more cryptographic processors may be used to perform cryptographic operations in the on-board computer system and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. The one or more cryptographic processors may further be configured to perform obfuscation and de-obfuscation algorithms described herein. Obfuscation and de-obfuscation algorithms may include various schemes for performing cryptographic operations on data including block ciphers, stream ciphers, and digital signature schemes. The cryptographic operations described herein may be implemented by software executing in the module, by hardware within the module, or a combination thereof. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure.

As noted above, in various embodiments of the present disclosure, cryptographic material (i.e., secret(s) such as cryptographic keys) is securely stored within the cryptographic module 1324. In some embodiments, the cryptographic module is implemented as or may contain a physically unclonable function (PUF), which is a function implemented in physical hardware to use one or more secrets that are based at least in part on physical characteristics of the PUF. As a result, any attempt to obtain a secret may require physical intrusion into the PUF and physical intrusion may alter the physical characteristics of the PUF, thereby destroying the secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bi-stable ring PUFs, magnetic PUFs, metal resistance PUFs and/or other devices whose physical characteristics encode information usable as or for a secret.

As illustrated in FIG. 13, the unmanned aerial vehicle's on-board computer system 1300 may include a set of sensors 1314 that gather data utilized by the various components of the on-board computer system. For instance, the sensors 1314 may include an altimeter that is used by the propulsion subsystem 1312 for flying and related activities (e.g., taking off and landing). As another example, the sensors 1314 may include a gyroscope that is used by the propulsion subsystem 1312 to control pitch, roll, and/or yaw. An accelerometer may be used by the propulsion subsystem 1312 as part of its avionics logic. A global positioning system (GPS) sensor may be used by the propulsion subsystem 1312 to control flight according to routes and also by other subsystems, such as by the one or more processors 1302 for calculation of routes (e.g., by obtaining a current location and calculating an optimal route to a specified destination). A compass may be used by the propulsion subsystem 1312 to control direction. A set of proximity sensors (e.g., using acoustic proximity detectors) may be used by the propulsion subsystem 1312 for the purpose of obstacle avoidance and accurate navigation (e.g., during a delivery). Some sensors may be used to gather environmental data, such as audio, video, digital images, and the like. Other environmental data may be related to the weather and, accordingly, the sensors 1314 may include sensors that gather weather data, such as wind speed, barometric pressure, humidity, visibility, and the like. The sensors listed are examples and, generally, the specific sensors that are used on an unmanned aerial vehicle may vary in accordance with the tasks that the unmanned aerial vehicle performs.

Figure 14:
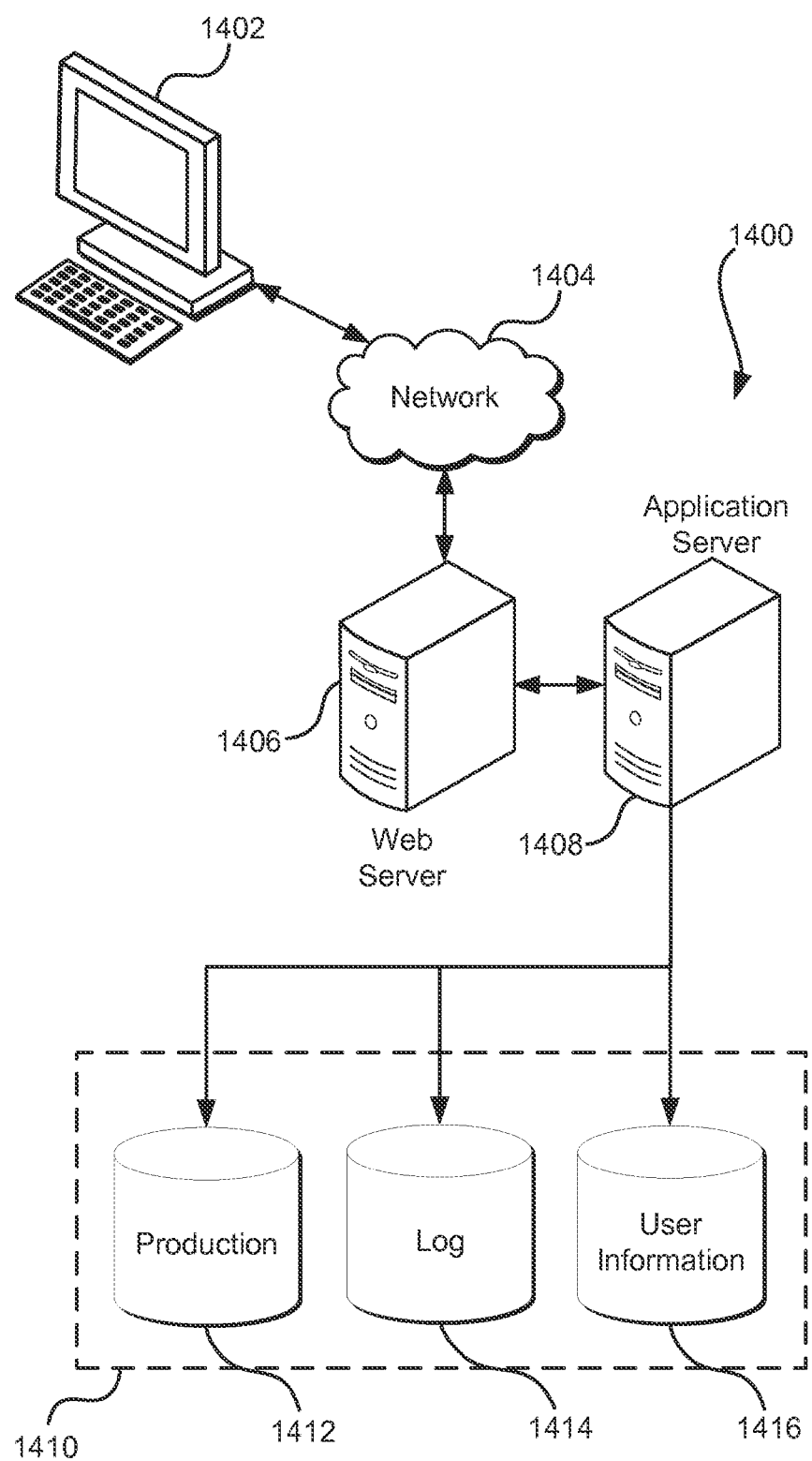
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transtask Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transtask of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle, comprising:
a propulsion subsystem configured to propel the unmanned aerial vehicle between locations;
a transceiver configured to receive and transmit messages; and
an on-board computer system including:
one or more processors; and
memory that stores:
a first set of messages received from other unmanned aerial vehicles via the transceiver;
a set of tasks to be completed by the unmanned aerial vehicle; and
instructions that, when executed by the one or more processors, cause the on-board computer system to:
receive, over the transceiver and from another unmanned aerial vehicle, a message and a plurality of digital signatures associated with the message;
determine, based at least in part on the plurality of digital signatures, a confidence level for the message;
determine, based at least in part on the determined confidence level, whether to accept the message; and
if determined to accept the message, modify the set of tasks in accordance with the message.

2. The unmanned aerial vehicle of claim 1, wherein the instructions that cause the on-board computer system to determine the confidence level, when executed by the one or more processors, cause the on-board computer system to determine whether a number of digital signature of the plurality of digital signatures forming a digital signature chain meets a minimum number for acceptance of the message, the digital signature chain comprising a subset of the plurality of digital signatures where each digital signature of the subset of the plurality of digital signatures is generated based at least in part on at least one other digital signature.

3. The unmanned aerial vehicle of claim 1, wherein the instructions that cause the on-board computer system to determine whether to accept the message, when executed by the one or more processors, cause the computer system to determine, based at least in part on a type of the message, a requisite confidence level and determine whether the determined confidence level at least meets the requisite confidence level.

4. The unmanned aerial vehicle method of claim 1, wherein the instructions further comprise instructions that, when executed by the one or more processors, cause the on-board computer system to:
receive, over the transceiver and from the other unmanned aerial vehicle, a second message;
determine, based at least in part on data available to the unmanned aerial vehicle, whether to confirm the second message;

if determined to confirm the second message, generate a digital signature for the second message; and transmit at least the second message and the generated digital signature to a second unmanned aerial vehicle that is different from the other unmanned aerial vehicle.

5. A computer-implemented method, comprising:
under the control of a computer system of an unmanned vehicle,
receiving, from another unmanned vehicle, a message and a plurality of digital signatures associated with the message;
determining, based at least in part on at least a subset of the plurality of digital signatures, that a quorum of unmanned aerial vehicles has vetted the message; and
updating an operational plan for the unmanned vehicle in accordance with the message as a result of the quorum of unmanned vehicles having vetted the message.

6. The computer-implemented method of claim 5, further comprising determining the quorum based at least in part on a type of the message.

7. The computer-implemented method of claim 5, wherein updating the operational plan comprises modifying, based at least in part on information in the message, a task to be performed by the unmanned vehicle.

8. The computer-implemented method of claim 5, further comprising:
receiving a second message from a second unmanned vehicle;
determining that the quorum of unmanned vehicles have yet to vet the message;
transmitting at least one request to confirm the second message;
receiving at least one response to the request;
determining, based at least in part on the received at least one response, that the quorum of unmanned vehicles has vetted the second message; and
updating the operational plan in accordance with the second message.

9. The computer-implemented method of claim 5, further comprising:
generating a digital signature for the message; and
transmitting the message, the plurality of digital signatures, and the generated digital signature to a second unmanned vehicle different from the other unmanned vehicle.

10. The computer-implemented method of claim 5, wherein:
the method further comprises determining, based at least in part on data collected from a set of sensors of the unmanned vehicle, to vet the message; and
generating the digital signature is contingent on said determining to vet the message.

11. The computer-implemented method of claim 5, wherein the quorum is a minimum number of unmanned vehicles.

12. The computer-implemented method of claim 5, wherein the unmanned vehicle and the other unmanned vehicle are unmanned aerial vehicles.

13. A non-transitory computer-readable storage medium having stored thereon executable instructions that, when executed by one or more processors of a computer system of an unmanned vehicle, cause the computer system to at least:
receive a message from another unmanned vehicle and a set of digital signatures associated with the message;
determine, based at least in part on the set of digital signatures, whether a set of unmanned vehicles that vetted the message satisfies a set of quorum rules;
if determined that set of quorum rules is unsatisfied, transmit at least one request for vetting of the message; and
process the message in accordance with one or more responses to the at least one request.

14. The non-transitory computer-readable storage medium of claim 13, wherein the instructions that cause the computer system to process the message, when executed by the one or more processors, cause the computer system to modify an operational plan of the unmanned vehicle if the one or more responses vet the message.

15. The non-transitory computer-readable storage medium of claim 13, wherein the instructions that cause the computer system to process the message, when executed by the one or more processors, cause the computer system to leave an operational plan at least temporarily unmodified if a response to the at least one request fails to vet the message.

16. The non-transitory computer-readable storage medium of claim 13, wherein:
the instructions further comprise instructions that, when executed by the one or more processors, cause the computer system to use a digital certificate of an unmanned vehicle specified as having generated the message to verify authenticity of the message; and
the instructions that cause the computer system to transmit the at least one request are configured to be executed as a result of an inability to verify authenticity of the message using the digital certificate.

17. The non-transitory computer-readable storage medium of claim 13, wherein the instructions further comprise instructions that, when executed by the one or more processors, cause the computer system to:
use locally collected data to determine whether to vet the message; and
if determined to vet the message, generate a digital signature for the message and transmit the message and the digital signature for the message to a second unmanned vehicle different from the other unmanned vehicle.

18. The non-transitory computer-readable storage medium of claim 13, wherein instructions that cause the computer system to determine whether the set of unmanned vehicles that vetted the message satisfies the set of quorum rules, when executed by the one or more processors, cause the computer system to, for each digital signature of at least a subset of the set of digital signatures:
use a digital certificate corresponding to the digital signature and an identifier of the message to generate a reference digital signature; and
verify whether the generated reference digital signature matches the digital signature.

19. The non-transitory computer-readable storage medium of claim 13, wherein the instructions that cause the computer system to process the message, when executed by the one or more processors, cause the computer system to modify a route to be travelled by the unmanned vehicle if the quorum rules are satisfied.

20. The non-transitory computer-readable storage medium of claim 13, wherein the instructions further comprise instructions that, when executed by the one or more processors, cause the computer system to select the set of quorum rules based at least in part on a type of the received message.

* * * * *

UNITED STATES PATENT AND TRADEMARK OFFICE
CERTIFICATE OF CORRECTION

PATENT NO. : 9,663,226 B2
APPLICATION NO. : 14/671203
DATED : May 30, 2017
INVENTOR(S) : Darren Ernest Canavor et al.

It is certified that error appears in the above-identified patent and that said Letters Patent is hereby corrected as shown below:

Column 5, Line 31:
the unmanned aerial may
Should read as:
the unmanned aerial vehicle may Column 5, Line 56:
an unmanned aerial detects
Should read as:
an unmanned aerial vehicle detects Column 6, Line 29:
other unmanned aerial,
Should read as:
other unmanned aerial vehicles, Column 8, Line 1:
an illustrative
Should read as:
an illustrative example Column 9, Line 12:
the digital received signature
Should read as:
the received digital signature Column 11, Line 15:
a first row of the data structure
Should read as:
a first column of the data structure Signed and Sealed this
Thirteenth Day of February, 2018

Andrei Iancu
*Director of the United States Patent and Trademark Office*

Column 19, Line 25:
reliant on the unmanned aerial vehicle from the message package was received 702
Should read as:
reliant on the unmanned aerial vehicle from which the message package was received 702

Column 19, Line 60:
Reprocessing the task may include, for example, calculating a new route that, in a manner independent of, avoidance of a location indicated in the message from the unmanned aerial vehicle.
Should read as:
Reprocessing the task may include, for example, calculating a new route in a manner independent of the message from the unmanned aerial vehicle to avoid a location indicated in the message from the unmanned aerial vehicle.

Column 20, Line 65:
additional uncompleted messages
Should read as:
additional uncompleted tasks Column 26, Line 47:
detect an ability with the unmanned aerial vehicle
Should read as:
detect an ability to communicate with the unmanned aerial vehicle

UNITED STATES PATENT AND TRADEMARK OFFICE
CERTIFICATE OF CORRECTION

PATENT NO. : 9,663,226 B2
APPLICATION NO. : 14/671203
DATED : May 30, 2017
INVENTOR(S) : Darren Ernest Canavor et al.

It is certified that error appears in the above-identified patent and that said Letters Patent is hereby corrected as shown below:

In the Specification

Column 8, Line 44:
"validity of digital signature is not enough to ensure the"
Should read as:
-- validity of digital signatures is not enough to ensure the --

Column 9, Line 19:
"Similarly, if one or both of the digital signature"
Should read as:
-- Similarly, if one or both of the digital signatures --

Column 9, Lines 40-41:
"identifier or a digital fingerprint of the digital certificate that may be included with the message."
Should read as:
-- identifier or a digital fingerprint of the digital certificate may be included with the message. --

Column 10, Line 31:
"digital certificates useable to verity the digital signatures"
Should read as:
-- digital certificates useable to verify the digital signatures --

Column 13, Line 63:
"an analysis of the date in accordance with executable"
Should read as:
-- an analysis of the data in accordance with executable --

Column 18, Lines 54-55:
"or may specify the unmanned aerial vehicle not to be trusted using an identifier of the unmanned"

Signed and Sealed this
Tenth Day of November, 2020

Andrei Iancu
*Director of the United States Patent and Trademark Office*

Should read as:
-- or may specify the unmanned aerial vehicle is not to be trusted using an identifier of the unmanned --

Column 19, Line 18:
"the process 800 may store information usable to"
Should read as:
-- the process 700 may store information usable to --

Column 21, Line 67:
"forming the processes 800's own data is applicable to the"
Should read as:
-- forming the process 800's own data is applicable to the --

Column 25, Line 35:
"include rejecting 906 the message, such described above."
Should read as:
-- include rejecting 906 the message, such as described above. --

Column 26, Line 64:
"transmit a request for the others' message log and the"
Should read as:
-- transmit a request for the other message log and the --

Column 27, Lines 12-13:
"may fail unless both unmanned aerial vehicles do not successfully authenticate to one another."
Should read as:
-- may fail unless both unmanned aerial vehicles successfully authenticate to one another. --

Column 28, Lines 2-3:
"information such as digital signatures such as for each message any digital signatures generated based at least in"
Should read as:
-- information such as digital signatures for each message, any digital signatures generated based at least in --

Column 29, Line 3:
"If determined 121 that there are no new actionable"
Should read as:
-- If determined 1212 that there are no new actionable --

Column 29, Line 67:
"components that propel the unmanned aerial vehicle 301 and"
Should read as:
-- components that propel the unmanned aerial vehicle 1301 and --

CERTIFICATE OF CORRECTION (continued)
U.S. Pat. No. 9,663,226 B2

Column 30, Line 25:
"a payload delivered by the unmanned aerial vehicle 301."
Should read as:
-- a payload delivered by the unmanned aerial vehicle 1301. --

Column 30, Line 43:
"of the unmanned aerial vehicle 301. For example, the"
Should read as:
-- of the unmanned aerial vehicle 1301. For example, the --

Column 30, Line 47:
"The payload management subsystem 114 may perform more"
Should read as:
-- The payload management subsystem 1314 may perform more --

Column 31, Lines 20-21:
"obtained via the network interface 1316 and/or one or more of the user interface input devices 1312."
Should read as:
-- obtained via the network interface and/or one or more of the user interface input devices. --

Column 32, Lines 25-30:
"on-board computer system 1300 may include a set of sensors 1314 that gather data utilized by the various components of the on-board computer system. For instance, the sensors 1314 may include an altimeter that is used by the propulsion subsystem 1312 for flying and related activities (e.g., taking off and landing). As another example, the sensors 1314 may"
Should read as:
-- "on-board computer system 1300 may include a set of sensors 1334 that gather data utilized by the various components of the on-board computer system. For instance, the sensors 1334 may include an altimeter that is used by the propulsion subsystem 1312 for flying and related activities (e.g., taking off and landing). As another example, the sensors 1334 may" --

Column 32, Line 47:
"be related to the weather and, accordingly, the sensors 1314"
Should read as:
-- be related to the weather and, accordingly, the sensors 1334 --